(12) United States Patent
Everton et al.

(10) Patent No.: US 10,459,602 B2
(45) Date of Patent: Oct. 29, 2019

(54) METHOD AND SYSTEM FOR ELECTRONIC COLLABORATION

(71) Applicant: Yapmo, Inc, Chicago, IL (US)

(72) Inventors: Paul Everton, Chicago, IL (US); Raymond Elward, Chicago, IL (US); Erich Luedtke, Chicago, IL (US)

( * ) Notice: Subject to any disclaimer, the term of this patent is extended or adjusted under 35 U.S.C. 154(b) by 545 days.

(21) Appl. No.: 15/078,665

(22) Filed: Mar. 23, 2016

(65) Prior Publication Data

US 2016/0202883 A1 Jul. 14, 2016

Related U.S. Application Data

(63) Continuation-in-part of application No. 14/666,359, filed on Mar. 24, 2015, now abandoned, and a continuation-in-part of application No. 14/213,020, filed on Mar. 14, 2014, now abandoned, which is a continuation-in-part of application No. 13/972,092, filed on Aug. 21, 2013, now abandoned, and a continuation-in-part of application No. 13/840,592, filed on Mar. 15, 2013, now abandoned, and a continuation-in-part of application No. 13/783,641, filed on Mar. 4, 2013, now abandoned.

(60) Provisional application No. 61/845,319, filed on Jul. 11, 2013, provisional application No. 61/787,342, filed on Mar. 15, 2013.

(51) Int. Cl.
*G06F 3/00* (2006.01)
*G06F 3/0482* (2013.01)
*H04L 29/08* (2006.01)
*G06F 16/28* (2019.01)
*G06F 3/0484* (2013.01)
*G06Q 10/10* (2012.01)
*G06F 3/0481* (2013.01)
*G06F 16/958* (2019.01)
*G06F 16/9535* (2019.01)

(52) U.S. Cl.
CPC .......... *G06F 3/0482* (2013.01); *G06F 3/0481* (2013.01); *G06F 3/0484* (2013.01); *G06F 3/04842* (2013.01); *G06F 16/285* (2019.01); *G06F 16/958* (2019.01); *G06F 16/9535* (2019.01); *G06Q 10/101* (2013.01); *H04L 67/02* (2013.01); *G06F 2203/04803* (2013.01)

(58) Field of Classification Search
CPC ......... G06F 17/30598; G06F 17/30867; G06F 17/3089; G06F 3/0481; G06F 3/0482; G06F 3/0484; G06F 3/04842; G06F 2203/04803; G06Q 10/101; H04L 67/02
See application file for complete search history.

(56) References Cited

U.S. PATENT DOCUMENTS

| | | | |
|---|---|---|---|
| 2011/0137940 A1* | 6/2011 | Gradin | G06F 16/9535 707/769 |
| 2011/0302221 A1* | 12/2011 | Tobin | G06F 16/24575 707/805 |
| 2012/0079004 A1* | 3/2012 | Herman | H04L 67/26 709/203 |
| 2012/0102153 A1* | 4/2012 | Kemp | G06F 16/24565 709/219 |

(Continued)

*Primary Examiner* — Mark D Featherstone
*Assistant Examiner* — Diedra McQuitery

(57) ABSTRACT

An electronic collaboration system via which a plurality of users can post and view content, rapidly located desired content, and be notified of new content in real time.

18 Claims, 31 Drawing Sheets

(56) References Cited

U.S. PATENT DOCUMENTS

| | | | | |
|---|---|---|---|---|
| 2012/0216115 A1* | 8/2012 | Lorenceau | ............ | G06Q 10/10 |
| | | | | 715/704 |
| 2013/0021370 A1* | 1/2013 | Dunn | .................... | G06Q 10/10 |
| | | | | 345/629 |
| 2014/0101149 A1* | 4/2014 | Winters | ................ | G06F 3/0482 |
| | | | | 707/736 |

* cited by examiner

METHOD AND SYSTEM FOR ELECTRONIC COLLABORATION

PRIORITY CLAIM/INCORPORATION BY REFERENCE

This application is a continuation-in-part of U.S. patent application Ser. No. 14/666,359 filed on Mar. 24, 2015, which is a continuation of U.S. patent application Ser. No. 13/783,641 filed on Mar. 4, 2013. This application is also a continuation-in-part of U.S. patent application Ser. No. 14/213,020 filed on Mar. 14, 2014, which claims priority to U.S. Provisional Patent Application 61/787,342 filed on Mar. 15, 2013, and which is a continuation-in-part of U.S. patent application Ser. No. 13/972,092 filed on Aug. 21, 2013. U.S. patent application Ser. No. 13/972,092 claims priority to U.S. Provisional Patent Application 61/845,319 filed on Jul. 11, 2013. This application is also a continuation-in-part of U.S. patent application Ser. No. 13/840,592 filed on Mar. 15, 2013. Each of the documents mentioned above is hereby incorporated herein by reference. U.S. patent application Ser. No. 13/757,937 is also incorporated by reference herein by way of its incorporation by reference in the above-incorporated U.S. Provisional Patent Application 61/787,342.

BACKGROUND

Limitations and disadvantages of conventional and traditional approaches to electronic collaboration will become apparent to one of skill in the art, through comparison of such approaches with some aspects of the present method and system set forth in the remainder of this disclosure with reference to the drawings.

DETAILED DESCRIPTION

Figure 1:
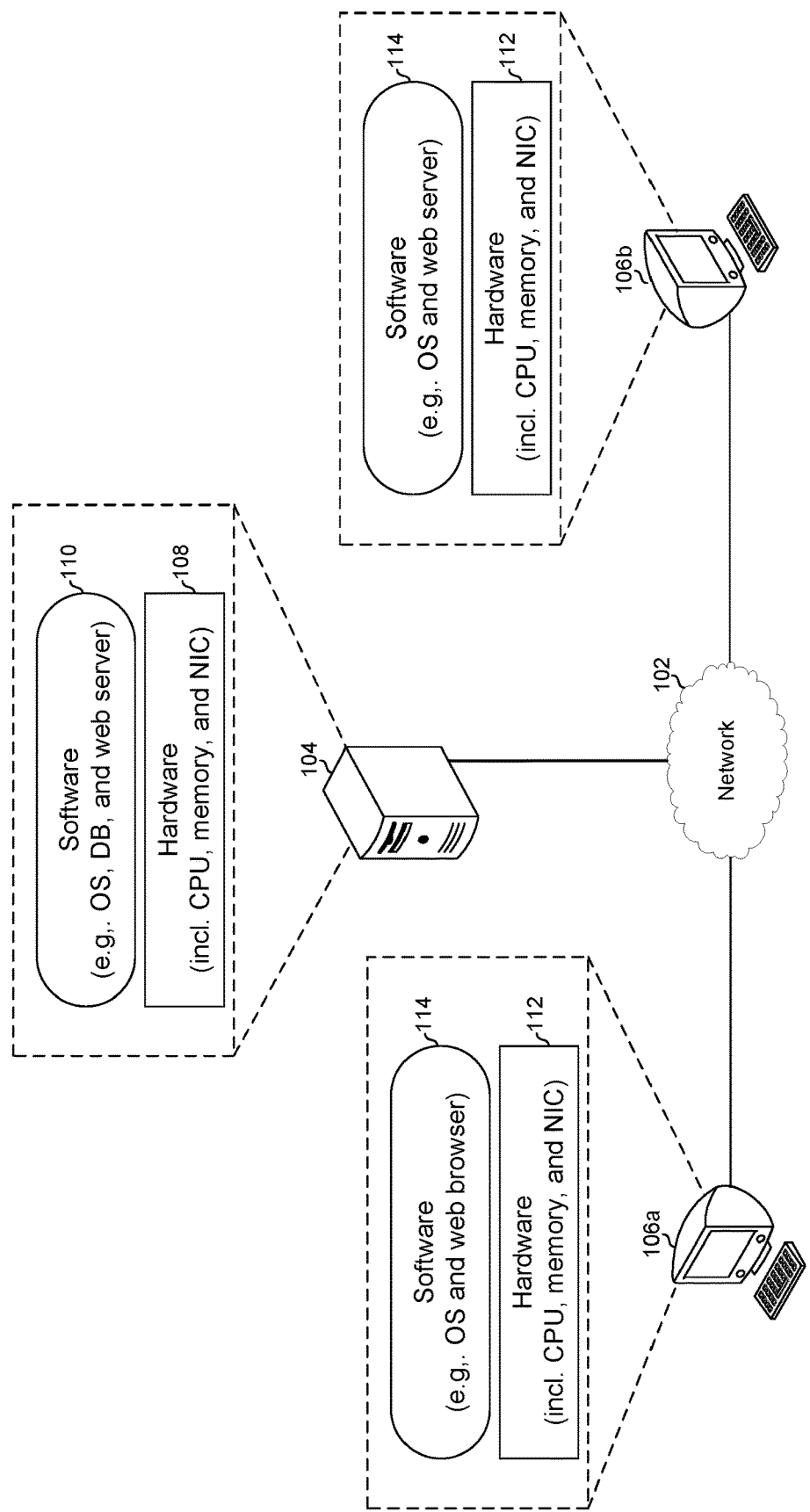
FIG. 1 depicts an example computing environment in accordance with aspects of this disclosure.

FIG. 1 depicts an example computing environment for idea generation and evaluation. Shown are a network 102, a computing device 104, and computing devices 106a and 106b. Examples of computing devices include: desktop computers, laptop computers, tablet computers, smartphones, stand-alone servers, rack-mounted servers, and the like. In an example implementation, the computing devices 104 may operate as a web and/or application server (e.g., may be a stand-alone or rack-mounted server), and the computing devices 106a-106b may each operate as an end-system (e.g., may be a personal computer, tablet computer, or a smart phone).

The network 102 may comprise a local area network and/or a wide area network. The network 102 may comprise, for example, network "plumbing" such as routers, switches, cables, etc. The network 102 may be, for example, the Internet and/or an Ethernet-based LAN.

The computing device 104 may comprise circuitry operable to process (e.g., read from memory, perform logic and/or arithmetic operations on, packetize according to one or more communication protocols, and/or the like) data to be sent via a network connection, send data via a network connection, receive data via a network connection, and process (e.g., write to memory, perform logic and/or arithmetic operations on, depacketize according to one or more communication protocols, and/or the like) data received via a network connection. Such data may include, for example, data formatted and communicated in accordance with one or more Internet-related standards (e.g., HTML, HTTP, TCP/IP, etc.), and/or with one or more vendor-specific Application Programming Interfaces (APIs). Such circuitry may enable the computing device 104 to operate as a web server and/or a vendor-specific application server.

The circuitry of the computing device 104 may comprise, for example hardware 108 and software 110. The hardware 108 may comprise, for example, a CPU, memory circuitry, and network interface circuitry (NIC). The software 110 may comprise, for example, an operating system, a database application, and a web server application. The database application(s) may, for example, store, organize, and/or provide access to data of an electronic forum and/or CRM data. The web server may, for example, serve a graphical user interface of the electronic forum and/or CRM database. The web server may, for example, serve a graphical user interface of the electronic forum.

The memory circuitry may comprise, for example, SRAM, DRAM, ROM, FLASH, magnetic storage, and/or any other suitable type of memory. The memory circuitry may store program memory, run-time memory, and/or mass storage. The memory circuitry may store files (e.g., HTML, CSS, and/or script files) and one or more databases (e.g., in which forum content and/or user account information is stored) of an electronic forum which may be hosted by the device 104. The memory circuitry may store data associated with a customer relationship management (CRM) database hosted by the device 104 (e.g., information about existing and potential customers, information about open sales opportunities, information about closed sales opportunities, and/or the like). Posts to the electronic forum may be stored, for example, as structured data (e.g., in a table, database, or the like).

The forum content may include, for example, text descriptions of ideas, files (e.g., images, presentations, papers, and/or the like) uploaded with idea submissions, comments on ideas, and attributes associated with submitted ideas. Such attributes may include, for example, a threshold parameter corresponding to the number of votes an idea needs to warrant further evaluation (e.g., to be passed onto a review committee), a parameter for tracking the number of votes an idea has received, a voting window parameter for determining the expiration time of an idea, and/or the like. The threshold number of votes needed for a particular idea to proceed to further evaluation may be based, for example, on attributes of the idea such as, for example, the user that submitted the idea (e.g., higher ranking users may need less votes, users with more successful past ideas may need less votes, and/or the like), the category under which the idea is submitted, the estimated cost of implementing the idea, estimated timeline for implementing the idea, and/or the like. The parameter for determining the expiration of the idea may be determined based, for example, on attributes of the user and/or attributes of the idea. In an example implementation, each vote may a unit-less values that simply represents one vote. For example, in a forum of 10 users, each with 10 votes, 1 vote may simply correspond to 1% of all votes). In another example implementation, votes may represent real-world value. For example, each vote may correspond to a dollar within the discretionary budget of the user that the user is pledging to the idea, in the event that the idea meets the threshold number of votes and/or supporters. For example, a user with a discretionary budget of $20,000 may cast $5000 worth of votes for a particular idea and, if that particular idea gets approved by committee, the $5000 would go toward the idea's budget.

The user account information ("user profiles") may include, for example, biographical information, user preferences, a user activity log, and/or user attributes. The biographical information may include, for example, name, address, contact info, work title, and/or the like. The user preferences may include, for example, which categories, tags, etc. that the user is interested in (e.g., manually set by the user and/or automatically populated based on the user's activity). The user preferences may include, for example, the user's subscriptions. A user's subscriptions determine which posts that the user is automatically notified of. In this regard, as described further below, the electronic forum may enable its users to subscribe to particular tags, to particular users, and/or to particular combinations of tags and/or users. The users may then be automatically notified (e.g., via a push notification to an app on their smartphone) upon creation of a post in the electronic forum that contains a tag, mention, or combination thereof to which the user is subscribed.

The user activity log may track, for example, which ideas the user has submitted and the fate of those submissions (e.g., whether they got sufficient votes to warrant further evaluation, whether they were eventually implemented, which users voted for them, and/or the like). The user activity log may track, for example, which ideas the user has voted for and the fate of those ideas (e.g., whether they got sufficient votes to warrant further evaluation, whether they were eventually implemented, which other users voted for them, and/or the like). The user attributes may include, for example, a total votes parameter. The total votes parameter may indicate how many concurrently outstanding votes that the user may have at any given time, where an outstanding vote is a vote cast for an idea that is currently open for voting (i.e., an unexpired idea). Additionally or alternatively, the user attributes may include an outstanding votes parameter that indicates how many outstanding votes the user currently has. Additionally or alternatively, the user attributes may include an available votes parameter which may indicate how the number of votes that the user could, at this moment, cast for one or more ideas that are open for voting (i.e., the difference between the user's total votes and outstanding votes).

The total votes parameter and/or outstanding votes parameter for a given user may be determined based on a variety of factors such as, for example, the user's job title, the user's seniority, past performance of ideas that the user voted for, past performance of ideas that the user submitted, and/or the like. For example, where a user's activity shows a propensity (e.g., above a threshold correlation between past successful ideas and said user's votes) for that user to vote for successful (as measured by any desired metric such as profit, cost savings, energy savings, etc.) ideas, that user's total votes parameter may be increased. Conversely, where a user's activity shows a propensity (e.g., below a threshold correlation between past successful ideas and said user's votes) for that user to vote for unsuccessful (as measured by any desired metric such as profit, cost savings, energy savings, etc.) ideas, that user's total votes parameter may be decreased.

The CPU may comprise, for example an x86-based processor, an ARM-based processor, or any other suitable circuitry operable to execute instructions (e.g., stored in the memory of hardware 108) for processing data, generating control signals, and/or otherwise performing, or causing other circuits to perform, functions described herein. In this manner, an operating system and one or more software applications may run on the computing device 104. Such software applications may include, for example, a CRM database, a web server, an application server, and/or processes for performing various aspects of a communication protocol (e.g., for implementing TCP/IP and interfacing the applications to the network 102).

The network interface circuitry may be operable to transmit and receive physical layer signals via the network. In the receive direction, the network interface circuitry may convert the signals to packets of binary data, and output the packets to the CPU and/or memory for processing. The network interface circuitry may, for example, receive signals in accordance with Ethernet physical layer protocols, assemble the signals to IP packets and output the IP packets to the CPU and/or memory. In the transmit direction, the network interface circuitry may receive IP packets from the CPU and/or memory, encapsulate the IP packets into Ethernet frames, and transmit the frames into the network 102 in accordance with Ethernet physical layer protocols.

In operation, the computing device 104 may operate as a web server to host an electronic forum via which users can submit ideas and evaluate ideas submitted by other users, as, for example, described below with reference to FIGS. 2-7. Additionally, In operation, the computing device 104 may operate as a web server to host an electronic forum and an interface via which users can interact with CRM data as, for example, described below with reference to FIGS. 8-14.

Each of the computing devices 106a and 106b may comprise circuitry operable to process (e.g., read from memory, perform logic and/or arithmetic operations on, packetize according to one or more communication protocols, and/or the like) data to be sent via a network connection, send data via a network connection, receive data via a network connection, process (e.g., write to memory, perform logic and/or arithmetic operations on, depacketize according to one or more communication protocols, and/or the like) data received via a network connection. Such data may include, for example, data formatted and communicated in accordance with one or more Internet-related standards (e.g., HTML, HTTP, TCP/IP, etc.), and/or in one or more vendor-specific Application Programming Interfaces (APIs). Such circuitry may enable each of the end-systems 106a-106c to operate as a web client, and/or run a vendor-specific application client. Additionally or alternatively, the circuitry may enable the computing devices 106a and 106b to present web-based content to a user (e.g., via speakers and/or a monitor) and accept input from a user (e.g., via touchscreen, keyboard, mouse, and/or the like).

The circuitry of the computing devices 106a and 106b may comprise, for example hardware 112 and software 114. The hardware 112 may comprise, for example, a CPU, memory circuitry, and network interface circuitry (NIC). The software 114 may comprise, for example, an operating system and a web browser application, and/or a vendor-specification client application (e.g., a CRM client application and/or an electronic forum client application).

The CPUs of computing devices 106a and 106b may each comprise, for example an x86-based processor, an ARM-based processor, or any other suitable circuitry operable to execute instructions (e.g., stored in the memory of hardware 112) for processing data, generating control signals, and/or otherwise performing, or causing other circuits to perform, functions described herein. In this manner, an operating system and one or more software applications may run on each computing device 106. Such software applications may include, for example, a web browser, a vendor-specific application client, and/or processes for performing various aspects of a communication protocol (e.g., for implementing TCP/IP and interfacing the applications to the network 102).

The network interface circuitry of devices 106a and 106b may each be operable to transmit and receive physical layer signals via the network. In the receive direction, the network interface circuitry may convert the signals to packets of binary data, and output the packets to the CPU and/or memory for processing. The network interface circuitry may, for example, receive signals in accordance with Ethernet physical layer protocols, assemble the signals to IP packets and output the IP packets to the CPU and/or memory. In the transmit direction, the network interface circuitry may receive IP packets from the CPU and/or memory, encapsulate the IP packets into Ethernet frames, and transmit the frames into the network 102 in accordance with Ethernet physical layer protocols.

In operation, a computing device 106 (referring to either or both of computing devices 106a and 106b) may access the electronic forum hosted by the computing device 104. A web browser (or vendor-specific "app") running on the computing device 106 may request content by, for example, sending HTTP requests (or in accordance with a vendor specific API) to the computing device 104. Packets containing requested content from the electronic forum may be transmitted into the network 102 by network interface circuitry and/or a CPU of the computing device 104. Received packets carrying requested content may be processed by network interface circuitry and/or CPU of the device 106 to recover the content and store it to memory of the device 106. The web browser (or "app") may then cause the content to be rendered for display (e.g., by the CPU) in a window on a monitor of the device 106. The requested content may, for example, comprise case studies that comprise selected data from the CRM database, where the case studies may be automatically generated and posted to the electronic forum in response to changes in the CRM data. Additionally, or alternatively, the requested content may comprise comments to the case study, and/or attachments to the case study). Packets containing data and/or commands to be submitted to the electronic forum may be transmitted into the network 102 by the network interface circuitry and/or CPU of the device 106. The packets may be processed via the network interface circuitry and/or CPU of the device 104 to recover the commands and/or data and respond appropriately.

Figure 2:
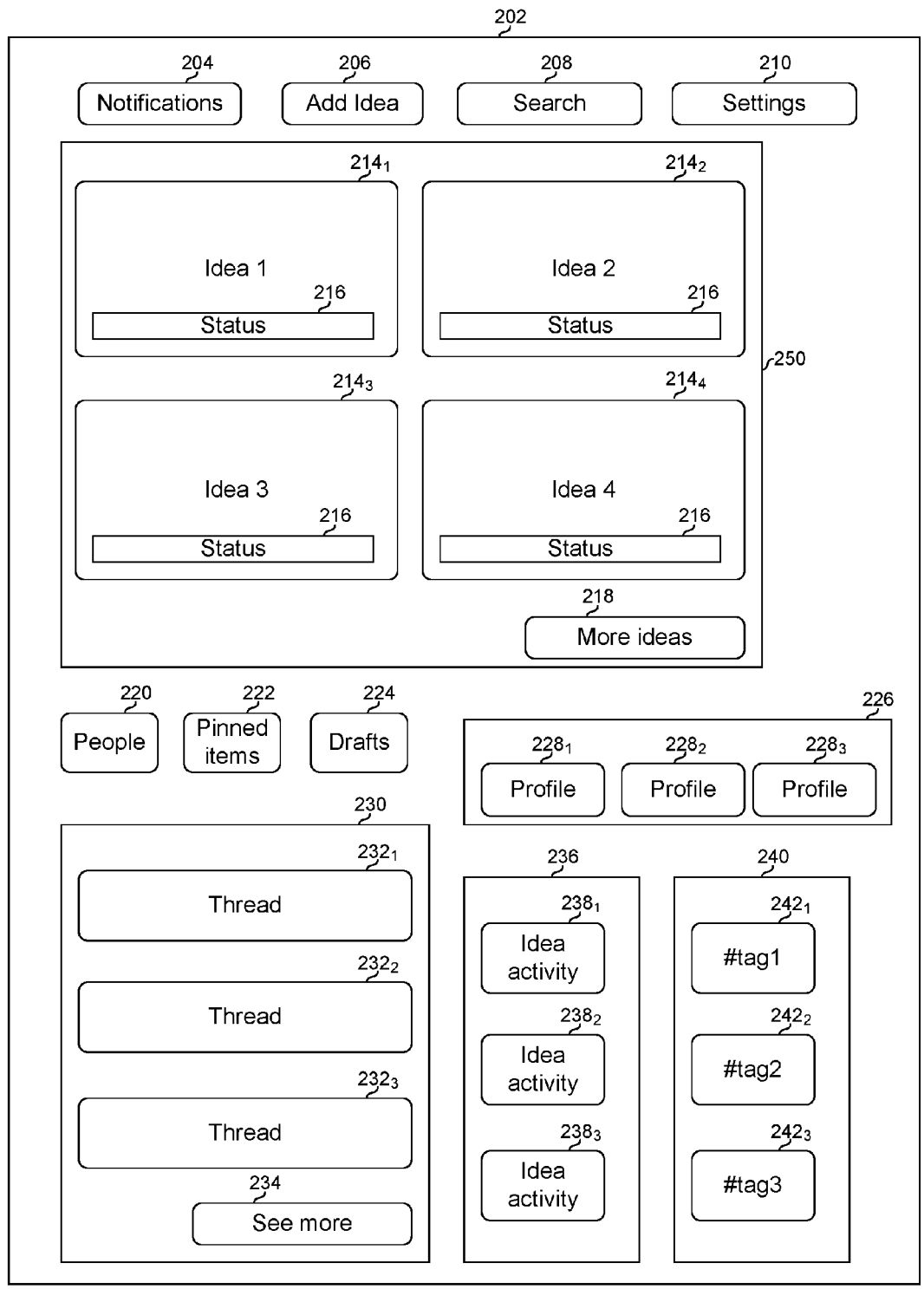
FIGS. 2-5 depict example user interface elements of a system for idea generation and evaluation.

Referring to FIG. 2, there is shown an example window (or screen) 202 of a graphical user interface of an electronic idea generation and evaluation forum. The window/screen 202 may, for example, be displayed on a monitor of device 106a and be interacted with via a mouse and keyboard of the device 106a. The example window 202 comprises a plurality of interface elements each which may be hyperlinks, text boxes, drop down menus, and/or the like.

Element 204 may be a link that, when interacted with (e.g., touched, clicked, or the like) brings up a window in which notifications for the user are displayed (e.g., an "inbox" of messages, statuses, and the like pertaining to submitted ideas, votes for ideas, and/or other activity in forum). Element 206 may be a link that, when interacted with, brings up a form for submitting a new idea. The form may have, for example, elements for entering: the title of the idea, a description of the idea, a categorization of the idea, for associating tags with the idea, and the like. Upon submission of the form, a thread and/or post may be created in the forum and other users may be enabled to view and vote on the idea. Element 208 may be, for example, a text-box for entering search queries for searching ideas, posts, attachments, and/or any other content of the forum. Element 210 may be a link that, when interacted with, brings up a window for configuring the user's profile and/or preferences. Interface elements 204-210 may be part of a "navigation bar" of the window/screen 202.

Element 250 comprises "at-a-glance" information about submitted ideas. For example, each time the window 202 is loaded, a plurality of submitted ideas may be algorithmically selected and displayed as elements 214, each of which comprises information about the idea (e.g., submitter, category, tags, summary, and/or the like) and its status (number of votes received, number of supporters, number of votes needed, time until expiration, and/or the like). For example, the selection of which ideas are displayed as elements 214 may be random. As another example, the selection may be based on characteristics of the ideas (e.g., on number of votes received, number of votes needed, time until expiration, and/or the like), the user profile of the user viewing the window 202 (e.g., idea categories the user prefers to see, tags the user has indicated an interest in, ideas submitted by particular users, and/or the like). Element 250 may also comprise a link 218 which, when interacted with, may bring up a window for viewing additional submitted ideas.

Element 220 may be a link that, when interacted with, brings up a list of users of the forum. Element 222 may be a link that, when interacted with, brings up a window in which ideas, posts, attachments, and/or other content of the forum that the user has previously selected to be saved ("pinned") can be viewed, edited, and/or the like. That is, the element 222 may bring up the user's personal/customized space on the forum. Element 224 may be a link that, when interacted with, brings up a window in which the user's drafts of ideas to be submitted, comments for previously submitted ideas, messages to be sent, and/or the like are saved and can be viewed, edited, and/or the like.

Element 226 may comprise "at-a-glance" information about recent activity on the forum. For example, element 226 may comprise links $228_1$-$228_3$ each of which corresponds to a user who recently submitted an idea, voted for an idea, commented on an idea, and/or otherwise generated activity on the forum.

Element 230 may comprise "at-a-glance" information about recent comment/discussion activity on the forum. For example, element 230 may comprise hyperlinks $232_1$-$232_3$, corresponding to three recent posts. Each element 232 may, for example, display a summary of the post, the author of the post, tags associated with the post, etc. The element 230 may also comprise element 234 which brings up a window via which posts beyond the recent ones associated with elements 232 can be viewed and interacted with.

Element 236 may comprise "at-a-glance" information about recent idea activity on the forum. For example, element 236 may comprise hyperlinks $238_1$-$238_3$, corresponding to three recent submitted ideas, recently submitted votes, and/or recently submitted comments on ideas. Each element 238 may, for example, display a summary of the idea, the submitter of the post, submitter of the vote, tags associated with the idea, etc.

Element 240 may comprise "at-a-glance" information about recent popular topics, posts, etc. on the forum. For example, element 240 may comprise hyperlinks $242_1$-$242_3$, corresponding to the three most-popular tags over a determined time interval.

Figure 3:
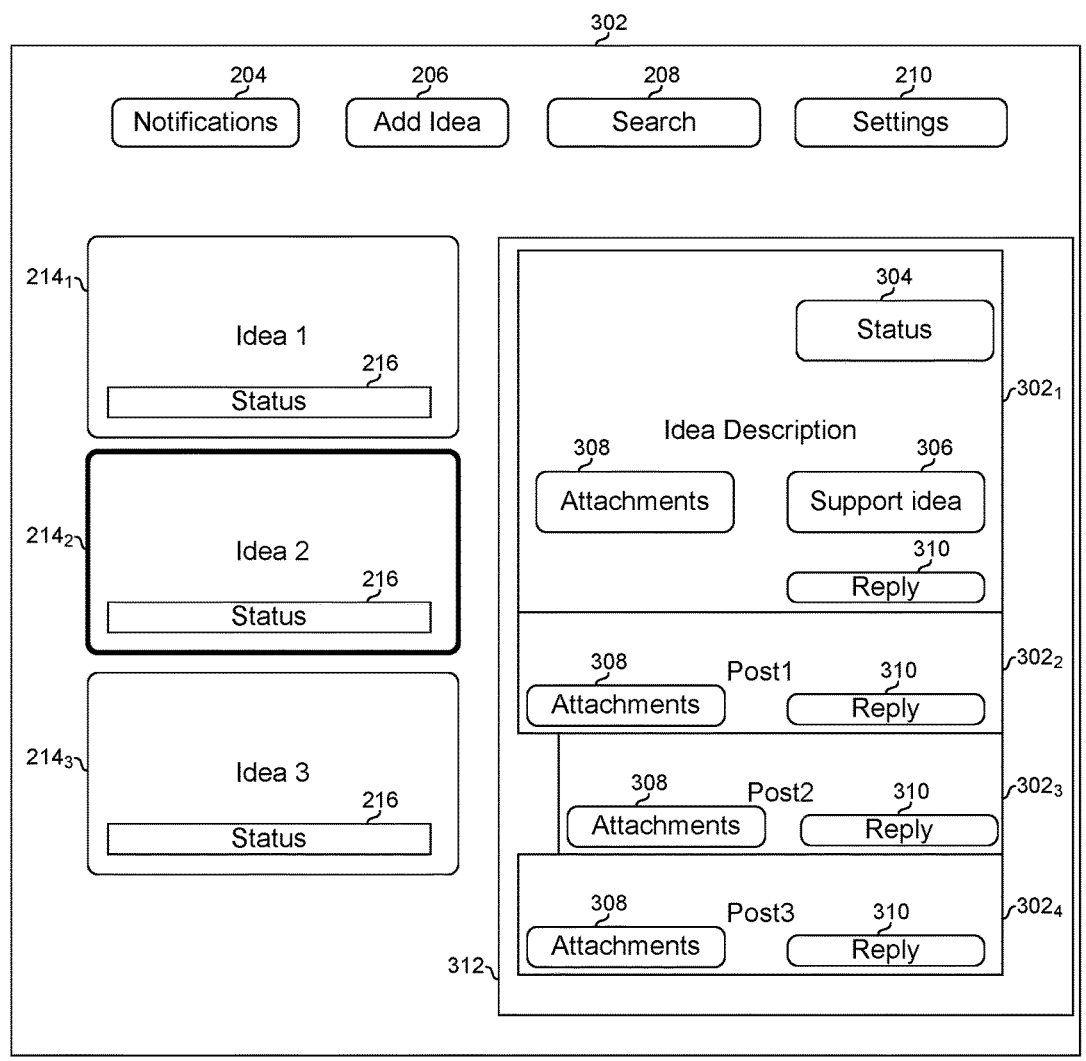

Referring to FIG. 3, there is shown an example window (or screen) 302 of a graphical user interface of an electronic idea generation and evaluation forum. The window/screen may, for example, be displayed on a monitor of device 106a and be interacted with via a mouse and keyboard of the device 106a. The example window 302 comprises a plurality of interface elements each which may be hyperlinks, text boxes, drop down menus, and/or the like. The window 302 may, for example, be displayed in response to interacting with one of the elements 214 of FIG. 2. In the example scenario shown, the window 302 is displayed in response to element $214_2$ having been selected (as indicated by the heavy line).

The elements 204-210 and 214 may be as described above with reference to FIG. 2. The element 312 may comprise elements 302 each of which may contain content pertaining to the idea.

A first element $302_1$ may comprise a post corresponding to the original idea submission. The element $302_1$ may comprise elements 304, 306, 208, and 310. The element 304 may indicate the status (e.g., number of votes received, number of supporters, number of votes needed, time until expiration, and/or the like) of the idea. The element 308 which comprise a link(s) to attachments (images, papers, and/or any other files uploaded by the submitter of the idea) submitted with the idea. The element 306 may comprise a link that, when interacted with, casts N vote(s) for the idea of element $302_1$. A vote being cast may cause, for example, a received votes parameter of the idea of element $302_1$ to increase by N, a needed votes parameter of the idea of element $302_1$ to decrease by N, an available votes parameter of the voting user to decrease by N, and/or an outstanding votes parameter of the voting user to increase by N, where N is a number. In an example implementation, the element 306 may enable configuration of the value of N. In this manner, a user may be enabled to submit more votes for ideas that s/he feels more strongly about. In an example implementation, the maximum number of votes that any single user may cast for an idea may be determined based on a needed votes parameter associated with the idea and a needed supporters parameter associated with the idea. In one such implementation, an idea may need at least V votes from at least U users and any single user may, therefore, be limited to a maximum of V/U votes. The element 310 may, when interacted with, bring up a form for submitting a comment/reply to the post $302_1$. The reply may then be displayed as a second element 302 in the element 312. Each of the remaining elements $302_2$-$302_4$ may be comments/replies to one or more of the posts in the element 312. For example, in the scenario shown, $302_2$ and $302_4$ are replies to $302_1$, and $302_3$ is a reply to $302_2$.

Figure 4:
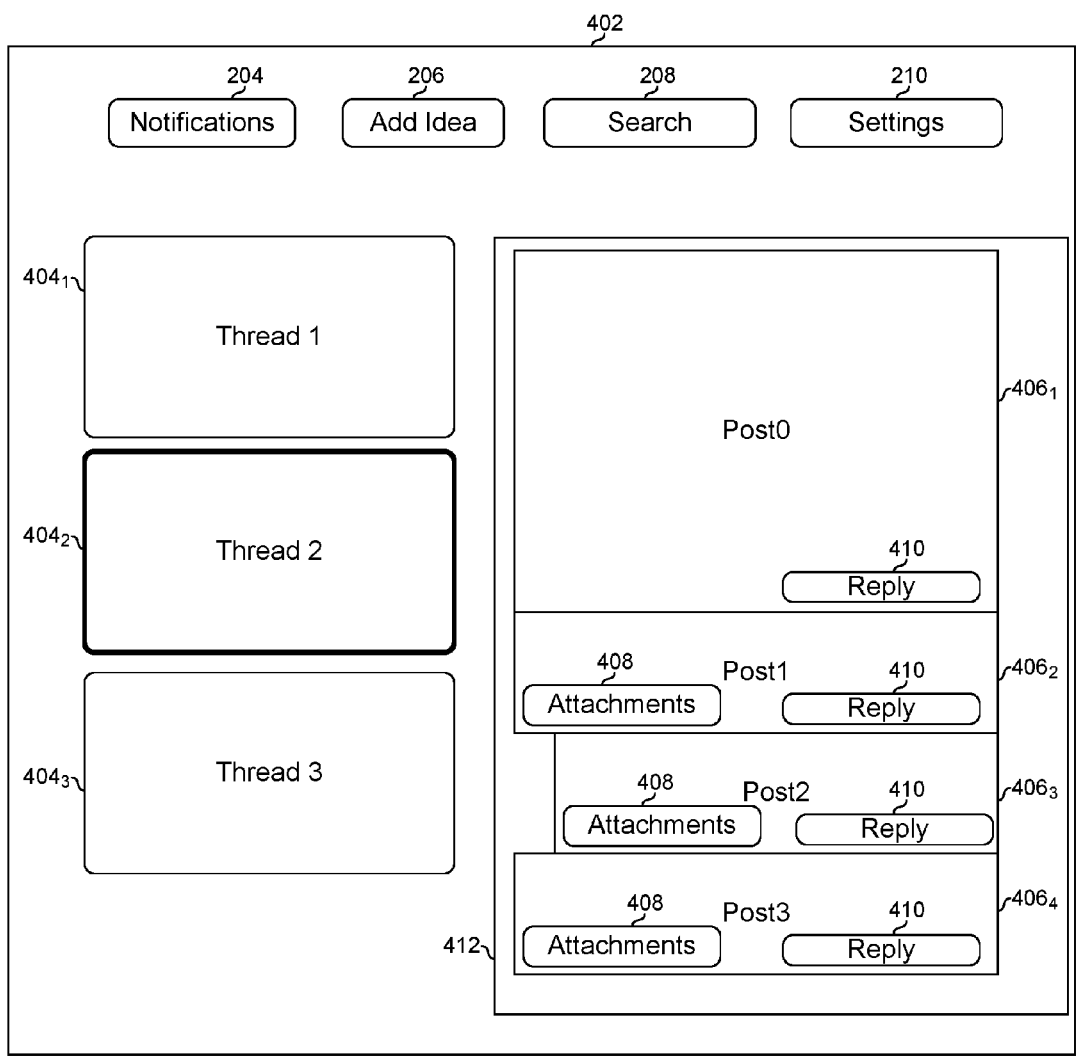

Referring to FIG. 4, there is shown a window 402 which is similar to the window 302 of FIG. 3. Whereas the window 302 comprises elements pertaining to particular ideas submitted for evaluation and voting on, window 402 provides a more general discussion forum. Each of the elements 404 may correspond to a thread. The element 412 may comprise elements 406 corresponding to posts of the selected thread. The element $406_1$ may correspond to the first post ("Post 0") of the thread. The elements 408 and 410 may be substantially similar to the elements 308 and 310, respectively, of FIG. 3.

Figure 5:
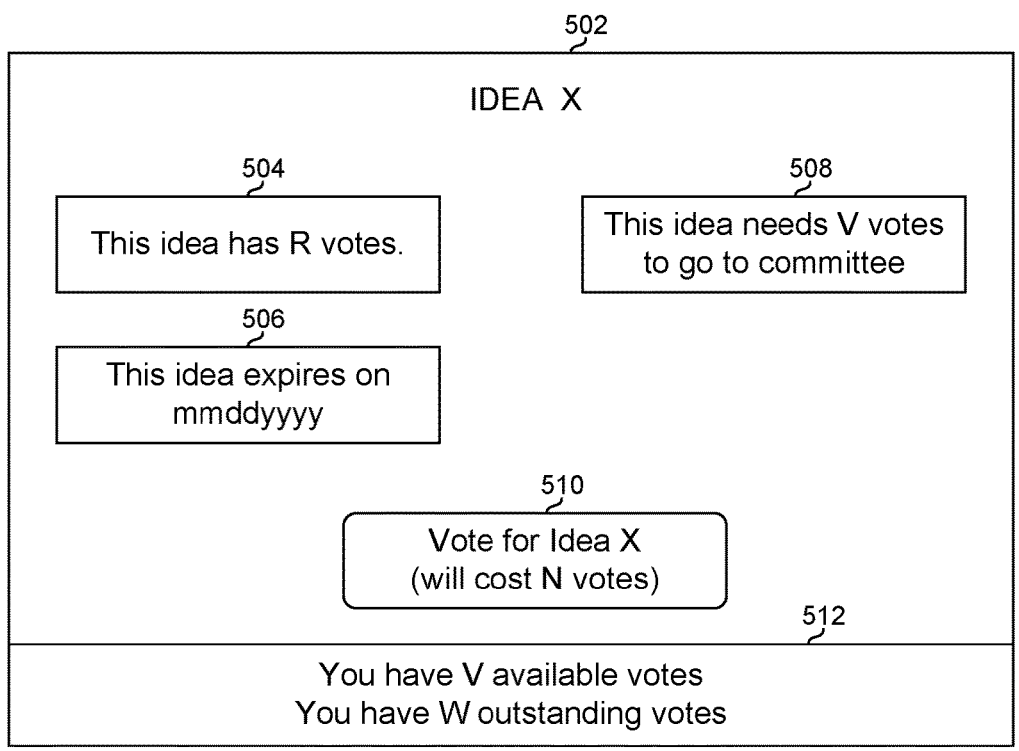

Referring to FIG. 5, there is shown an element 502 which may, for example, correspond to a more-detailed view of the element $302_1$ of FIG. 3. The example element 502 comprises elements 504, 506, 508, 510, and 512. The element 504 may display a value (shown as a' in the example depicted) of the received votes parameter for the idea associated with element 502. The element 506 may display the expiration date/time parameter (displayed as 'ddmmyyyy' in the example depicted) of the idea associated with element 502. The element 508 may display the needed votes parameter (displayed as 'V' in the example depicted) for the idea associated with element 502. The needed votes parameter may be formatted as total votes and/or remaining votes (i.e., total votes minus received votes). The element 510 may correspond to the element 306 of FIG. 3. The element 510 may display the number of votes (displayed as 'N' in the example depicted) that will be subtracted from the user's available votes and added to the user's outstanding votes if the user decided to click 510 to vote for the idea associated with element 502 (this value may be configurable by the voting user). The element 512 may display the value of the user's available votes, total votes, and/or outstanding votes parameters.

Figure 6:
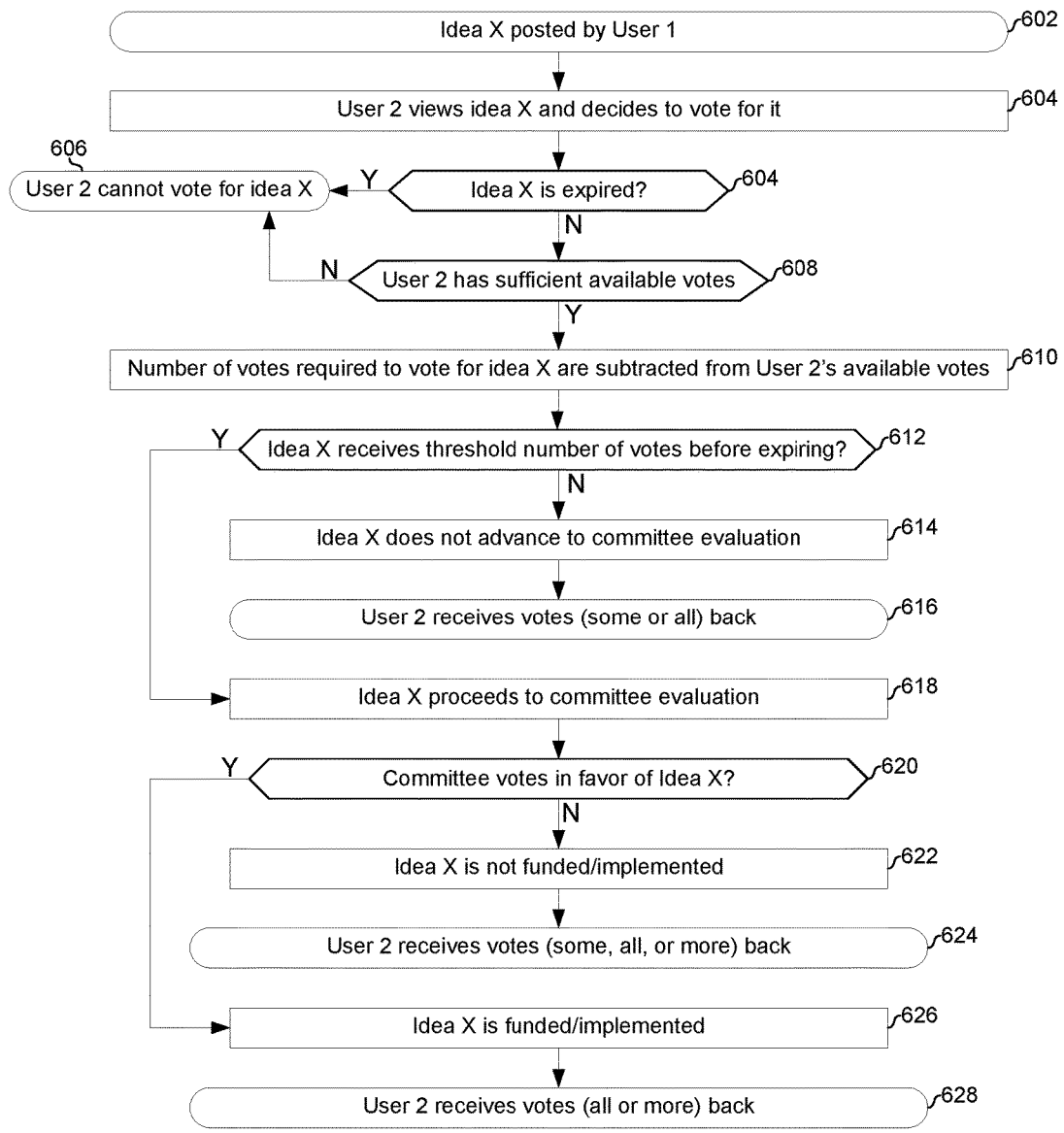
FIG. 6 is a flowchart illustrating an exemplary process performed by a system for idea generation and evaluation.

FIG. 6 is a flowchart illustrating an exemplary process performed by a system for idea generation and evaluation. In the process of FIG. 6, a particular user's available votes may be limited (e.g., according to the administrator-defined rules and/or based on an actual monetary budget available to the user). The process begins with block 602 in which a user ("User 1") submits an idea ("Idea X") using element 206. In block 604, User 2 views Idea X (e.g., selects an element 214 corresponding to Idea X, which brings up an element 312 corresponding to Idea X). In block 604, it is determined whether Idea X is still open for voting. If not, then in block 606, User 2 is prevented from voting for Idea X.

Returning to block 604, if Idea X is still open for voting, then in block 608 it is determined whether User 2 has at least the minimum number of available votes required to vote for Idea X. For example, if Idea X requires M (an integer greater than or equal to 1) vote(s) to support it, it is determined whether User 2 has at least M available vote(s). If User 2 does not have sufficient available votes, then the process advances to block 606 and User 2 is prevented from supporting Idea X. User 2 may be able to vote for Idea X later, however, if one or more other ideas for which User 2 has outstanding votes expires before Idea X expires (and frees up a sufficient number of User 2's votes).

Returning to block 608, if User 2 has sufficient available votes, then in block 610 User 2 votes for Idea X (e.g., by clicking a corresponding element 306) and the number of votes cast in favor of Idea X ('N') is subtracted from User 2's available votes and added to User 2's outstanding votes.

In block 612, after Idea X expires, it is determined whether Idea X received threshold number of votes (indicated by a needed votes parameter) to advance for further evaluation (e.g., to be placed before management and/or a review committee). If Idea X has not received the threshold number of votes, then in block 614 Idea X expires without further evaluation. Subsequently, in block 616, received votes for Idea X are returned to the users who cast them. Accordingly, User 2's outstanding votes parameter may be decreased by the amount of votes that User 2 cast for Idea X and User 2's available votes parameter may be increased by an amount less than, equal to, or greater than the number of votes that User 2 cast for Idea X. Where User 2's outstanding votes parameter is decreased by less than the increase of User 2's available votes parameter, User 2's total votes parameter may be increased by the difference ("voting profit"). User 2's total votes parameter being increased may be a way of rewarding User 2 for participating in the voting process and/or as a way to give User 2 a greater chance at voting for a successful idea in the future. Where User 2's outstanding votes parameter is decreased by more than the increase of User 2's available votes, User 2's total votes parameter may be decreased by the difference ("voting profit"). User 2's total votes parameter being decreased may be a way of penalizing User 2 for voting for an idea that didn't make it to committee, to encourage User 2 to vote carefully and/or as a way to give greater sway to voters who are better at identifying successful ideas. Where votes correspond to real dollars, the dollars corresponding to "voting loss" may be held in an account to pay future "voting profit."

Returning to block 612, if Idea X does receive the threshold number of votes, then, in block 618 Idea X continues on for committee review. Next, in block 620, if the committee does not vote in favor of Idea X, then, in block 622, Idea X is not funded or implemented. Then, in block 624, Subsequently, in block 624 received votes for Idea X are returned to the users who cast them. Accordingly, User 2's outstanding votes parameter may be decreased by the amount of votes that User 2 cast for Idea X and User 2's available votes parameter may be increased by an amount less than, equal to, or greater than the number of votes that User 2 cast for Idea X. Where User 2's outstanding votes parameter is decreased by less than the increase of User 2's available votes parameter, User 2's total votes parameter may be increased by the difference ("voting profit"). User 2's total votes parameter being increased may be, for example, a way of rewarding User 2 for voting for an idea that made it to committee and/or as a way to give greater sway to voters such as User 2 who are better at identifying successful ideas. Where User 2's outstanding votes parameter is decreased by more than the increase of User 2's available votes, User 2's total votes parameter may be decreased by the difference ("voting loss"). User 2's total votes parameter being decreased may be, for example, a way of penalizing User 2 for voting for an idea that wasn't approved by committee, to encourage User 2 to vote carefully and/or as a way to give greater sway to voters who are better at identifying successful ideas. Where votes correspond to real dollars, the dollars corresponding to "voting loss" may be held in an account to pay future "voting profit."

Returning to block 620, if the committee does vote in favor of Idea X, then in block 626 Idea X is funded and/or implemented. Next, in block 628, User 2's outstanding votes parameter may be decreased by the amount of votes that User 2 cast for Idea X and User 2's available votes parameter may be increased by an amount less than, equal to, or greater than the number of votes that User 2 cast for Idea X. Where User 2's outstanding votes parameter is decreased by less than the increase of User 2's available votes parameter, User 2's total votes parameter may be increased by the difference ("voting profit"). User 2's total votes parameter being increased may be, for example, a way of rewarding User 2 for voting for an idea that got funded/implemented and/or as a way to give greater sway to voters such as User 2 who are better at identifying successful ideas. Where User 2's outstanding votes parameter is decreased by more than the increase of User 2's available votes, User 2's total votes parameter may be decreased by the difference ("voting loss"). User 2's total votes parameter being decreased may be, for example, a way of giving other users greater chances at voting for a successful idea in the future (i.e., to encourage diversity of successful ideas). Where votes correspond to real dollars, the dollars corresponding to "voting loss" may be held in an account to pay future "voting profit."

In an example implementation, User 2's available votes may be increased by a first amount in block 616 (should the process arrive at block 616), by a second amount in block 622 (should the process arrive at block 622), and by a third amount in block 628 (should the process arrive at block 628), where first amount<second amount<third amount. For example, a forum administrator may set a return on investment parameter to 80% for block 616, to 100% for block 624, and to 120% for block 628. In such an example, a user casting N votes for an idea that reaches block 616 may result in only 0.8*N votes being returned to the user's available votes, a user casting N votes for an idea that reaches block 624 may result in N votes being returned to the user's available votes, and a user casting N votes for an idea that reaches block 628 may result in 1.2*N votes being returned to the user's available votes.

Figure 7:
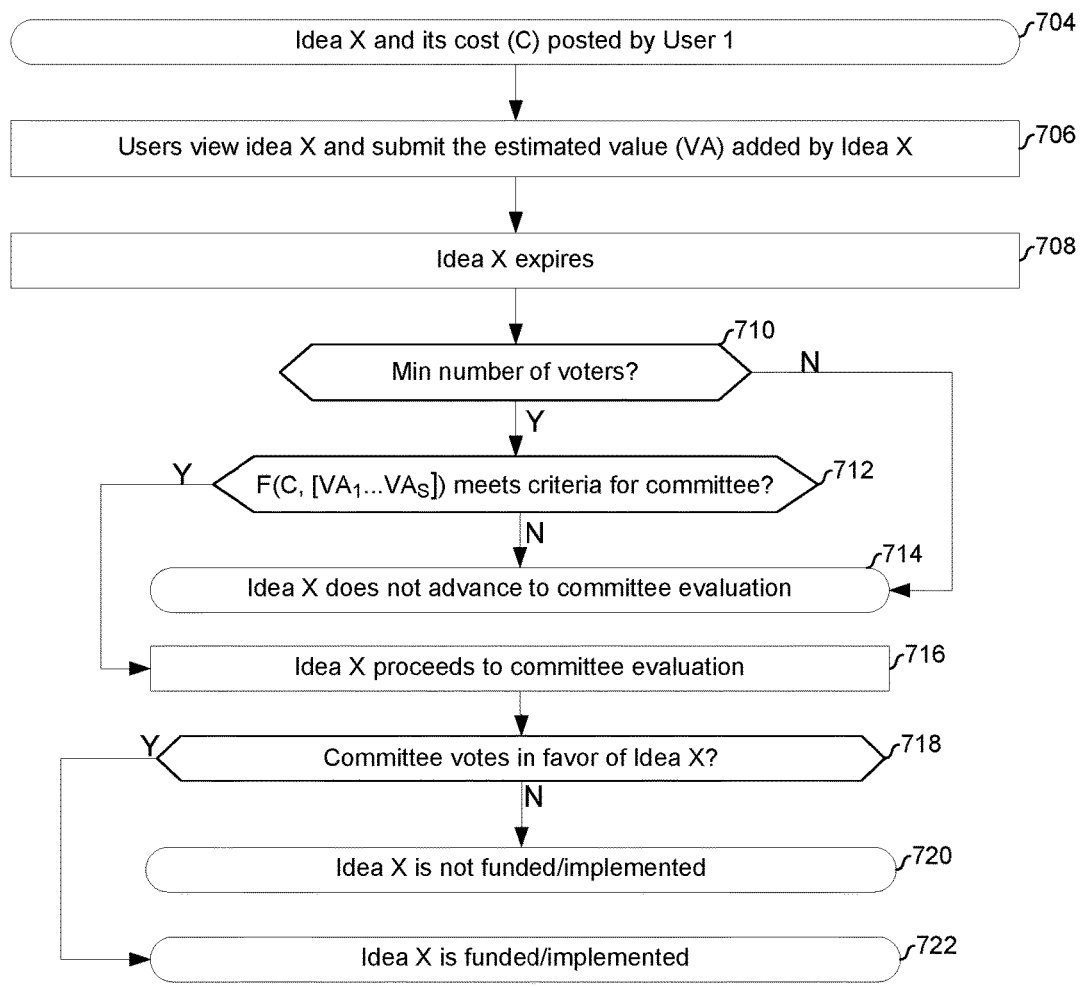
FIG. 7 is a flowchart illustrating an exemplary process performed by a system for idea generation and evaluation using value-added-based voting.

FIG. 7 is a flowchart illustrating an exemplary process performed by a system for idea generation and evaluation using value-added-based voting. The process begins with block 704 in which User 1 submits Idea X. As part of the submission of Idea X, User 1 may set a cost parameter equal to the forecasted amount of money that it would take to implement Idea X. In block 706, until Idea X expires, other users may view it in the forum and submit votes for it. In this example implementation, each particular user may vote for Idea X by inputting a dollar amount corresponding to the value that the particular user estimates Idea X would bring to the user's business (e.g., division in the company that the user manages, the product line(s) that the user manages, etc.). For example, a vote of $10,000 dollars for Idea X by User 2 may correspond to User 2 estimating that Idea X would add $10,000 to User 2's business. Similarly, a vote of −$20,000 may mean that User 2 believes Idea X would actually subtract value from his business. In block 708, the voting window for Idea X expires. In block 710, it is determined whether a minimum number of voters (e.g., set by a forum administrator and/or based on results of past idea submissions and voting) have submitted votes for Idea X. If not, then, in block 714, the Idea does not advance for further evaluation (e.g., committee review).

Returning to block 710, if a minimum number of users did submit votes for idea X, then in block 712, a metric that is a function of the cost of Idea X and the value added numbers input by the voters is calculated and used to determine whether Idea X should advance for further evaluation. For example, the total value added (i.e., the sum of all votes) may be compared to a multiple of the cost (e.g., 1.5*C). If the metric indicates that further evaluation is not warranted, then, in block 714, Idea X does not advance. If, however, the metric indicates that further evaluation is warranted, then, in block 718, Idea X proceeds to committee evaluation.

In block 718, if the committee votes against Idea X, then, in block 720, Idea X is not funded. On the other hand, if the committee votes in favor of Idea X then, in block 722, Idea x is funded/implemented.

In an example implementation, a computing system (e.g., 104) may generate elements of a graphical user interface that comprises interface elements for submission of ideas. In response to a first one of a plurality of users (e.g., working at computing device 106a) of the computing system submitting an idea via the graphical user interface (e.g., via interface element 206), the computing system may set a value (e.g., in memory of hardware 108) of a voting window parameter for the submitted idea, the value corresponding to a duration of a voting window for the submitted idea. In response to a first one of a plurality of users of the computing system submitting an idea via the graphical user interface (e.g., via interface element 206), the computing system may generate elements of the graphical user interface via which others of the plurality of users can cast votes for the submitted idea, wherein each cast vote for the submitted idea increases a received vote count parameter (e.g., in memory of hardware 108) associated with the submitted idea. In response to a second one of the plurality of users (e.g., working at computing device 106a) of the computing system submitting a vote for the submitted idea during the voting window, the computing system may decrease an available votes parameter associated with the second user, whereby the available votes parameter is based on a limit on concurrently outstanding votes by the second user. In response to determining, based on the voting window parameter, that the voting window for the submitted idea is complete, the computing system may, if the vote count parameter is above or equal to a threshold, generate an indication that the submitted idea is to undergo further evaluation. In response to determining, based on the voting window parameter, that the voting window for the submitted idea is complete, the computing system may, if the vote count parameter is below the threshold, generate an indication that the submitted idea is not to undergo further evaluation. In response to determining, based on the voting window parameter, that the voting window for the submitted idea is complete, the computing system may increase the available votes parameter associated with the second user.

Figure 8:
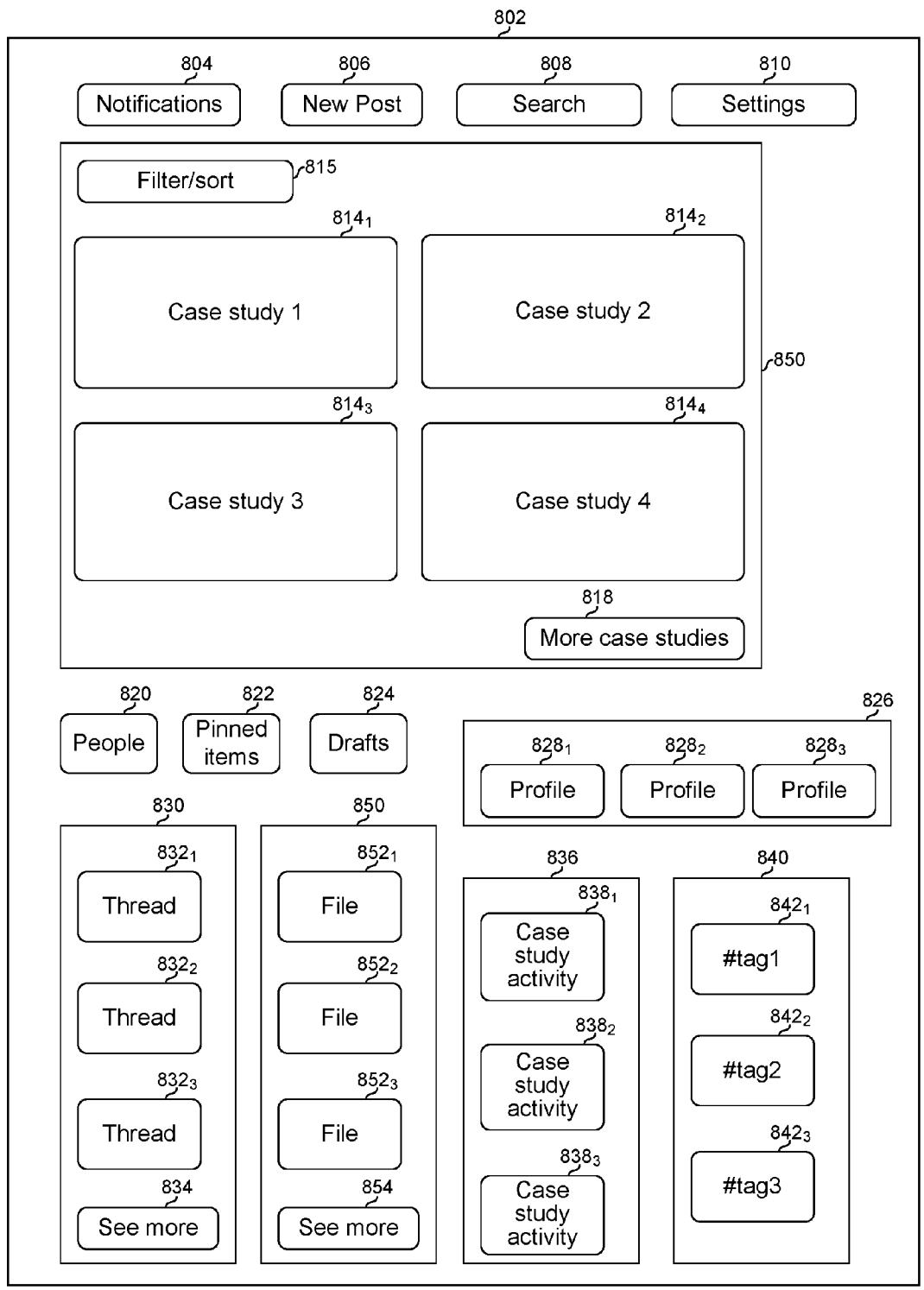
FIGS. 8-12 depict example user interface elements of a system for customer relationship management and collaboration.

Referring to FIG. 8, there is shown an example window (or screen) 802 of a graphical user interface of an electronic forum integrated with a CRM database. The window/screen 802 may, for example, be presented on a monitor of device 106a and be interacted with via a mouse and keyboard of the device 106a. The example window 802 comprises a plurality of interface elements each which may be hyperlinks, text boxes, drop down menus, and/or the like.

Element 804 may be a link that, when interacted with (e.g., touched, clicked, or the like) brings up a window in which notifications for the user are displayed (e.g., an "inbox" of messages, statuses, and the like pertaining to case studies and/or other activity in forum). Element 806 may be a link that, when interacted with, brings up a form for generating a new case study (e.g., a manually generated or "one-off" case study). The form may have, for example, elements for entering: the title of the post, a description of the post, a categorization of the post, for associating tags with the post, and the like. In an example implementation where manually-generated case studies may be posted, the form may comprise elements for defining rules as to when the case study should post (e.g., based on selected CRM fields having specified contents) and/or for defining rules as to the contents of the case study (e.g., which CRM fields should be placed in the body of the case study). Upon submission of the form, a thread and/or post may be created in the forum and other users may be enabled to view and reply to it. Element 808 may be, for example, a text-box for entering search queries for searching case studies, posts, attachments, and/or any other content of the forum. Element 810 may be a link that, when interacted with, brings up a window for configuring the user's profile and/or preferences. Interface elements 804-810 may be part of a "navigation bar" of the window/screen 802.

Element 850 comprise "at-a-glance" information about generated case studies. For example, each time the window 802 is loaded, a plurality of case studies may be algorithmically selected and displayed as elements 814, each of which comprises information about a particular case study (e.g., associated business unit, the customer, employees, and/or the like) and its status (e.g., whether a sales opportunity is "open" or "closed"). For example, the selection of which case studies are displayed as elements 814 may be random. As another example, the selection may be based on characteristics of the case studies (e.g., time generated), the user profile of the user viewing the window 802 (e.g., case studies that pertain to customers, business units, technology sectors, etc. that the user is associated with in his/her account profile), tags the user has indicated an interest in, case studies submitted by other users that are associated with the viewing user in a company organization chart, and/or the like. Element 850 may also comprise a link 818 which, when interacted with, may bring up a window for viewing additional case studies. Element 850 may also comprise a link 815 which, when interacted with, may bring up a window for filtering and/or sorting the case studies presented in element 850.

Element 820 may be a link that, when interacted with, brings up a list of users of the forum. Element 822 may be a link that, when interacted with, brings up a window in which case studies, posts, attachments, and/or other content of the forum that the user has previously selected to be saved ("pinned") can be viewed, edited, and/or the like. That is, the element 822 may bring up the user's personal/customized space on the forum. Element 824 may be a link that, when interacted with, brings up a window in which the user's drafts of case studies to be submitted, comments for previously posted case studies, messages to be sent, and/or the like are saved and can be viewed, edited, and/or the like.

Element 826 may comprise "at-a-glance" information about recent activity on the forum. For example, element 826 may comprise links $828_1$-$828_3$ each of which corresponds to a user who recently commented on a case study, caused the generation of a case study, and/or otherwise generated activity on the forum.

Element 830 may comprise "at-a-glance" information about recent comment/discussion activity on the forum. For example, element 830 may comprise hyperlinks $832_1$-$832_3$, corresponding to three recent posts. Each element 832 may, for example, display a summary of the post, the author of the post, tags associated with the post, etc. The element 830 may also comprise element 834 which brings up a window via which posts beyond the recent ones associated with elements 832 can be viewed and interacted with.

Element 850 may comprise "at-a-glance" information about recent files posted to the forum. For example, element 850 may comprise hyperlinks $852_1$-$852_3$, corresponding to three recent files (e.g., word processor files, spreadsheet files, images, videos, etc.). Each element 852 may, for example, display a summary of the file, the author/poster of the file, tags associated with the file, etc. The element 830 may also comprise element 854 which brings up a window via which files beyond the recent ones associated with elements 852 can be viewed and interacted with.

Element 836 may comprise "at-a-glance" information about recent case study activity on the forum. For example, element 836 may comprise hyperlinks $838_1$-$838_3$, corresponding to three recently generated case studies (e.g., in response to three recently updated CRM records) and/or recent comments/replies to case studies. Each element 838 may, for example, display a summary of the activity and/or case study, the user associated with the activity and/or case study, tags associated with the activity and/or case study, etc.

Element 840 may comprise "at-a-glance" information about recent popular topics, posts, etc. on the forum. For example, element 840 may comprise hyperlinks $842_1$-$842_3$, corresponding to the three most-popular tags over a determined time interval.

Figure 9:
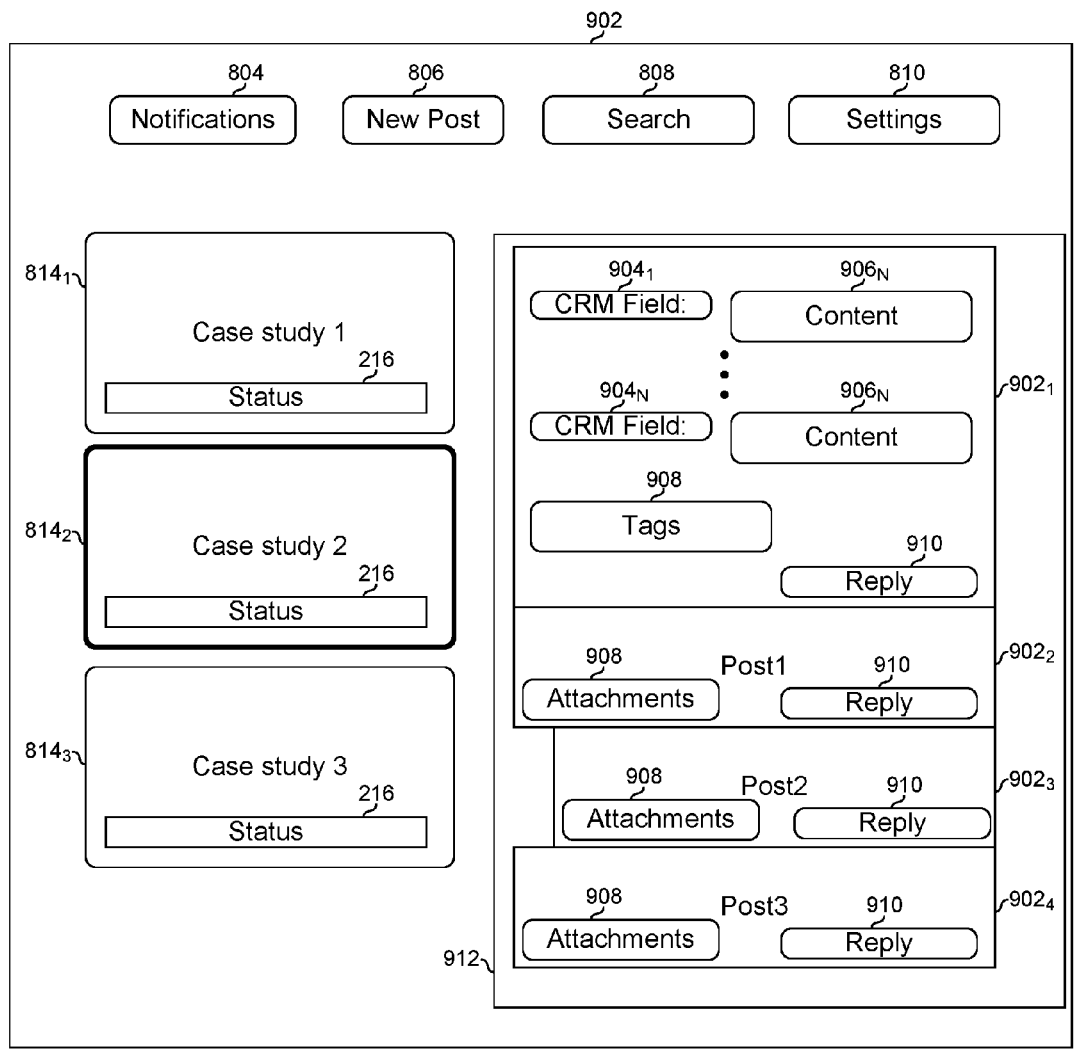

Referring to FIG. 9, there is shown an example window (or screen) 902 of a graphical user interface of an electronic forum integrated with a CRM database. The window/screen 902 may, for example, be presented on a monitor of device 106a and be interacted with via a mouse and keyboard of the device 106a. The example window 902 comprises a plurality of interface elements each which may be hyperlinks, text boxes, drop down menus, and/or the like. The window 902 may, for example, be displayed in response to interacting with one of the elements 814 of FIG. 2. In the example scenario shown, the window 902 is displayed in response to element $814_2$ having been selected (as indicated by the heavy line).

The elements 804-810 and 814 may be as described above with reference to FIG. 8. The element 912 may comprise elements 902 each of which may contain content pertaining to a particular case study ("Case Study 2" in the example depicted).

A first element $902_1$ may present the case study. The element $902_1$ may comprise elements $904_1$-$904_N$, elements $906_1$-$906_N$, 808, and 910. Each of the elements $904_1$-$904_N$ may be one of N (an integer) CRM fields selected by a user or administrator to be placed in the case study. Each of the elements $906_1$-$906_N$ may comprise contents of a corresponding one of the selected CRM fields. For example, field $904_1$ may be a "Customer Name" field for a particular CRM record and the corresponding field $906_1$ may contain "CompanyX."

The case study $902_1$ may be automatically generated and posted in response to a user-defined rule (e.g., defined by a forum administrator using an interface such as is described with reference to FIG. 12 below) for generating and posting case studies. In an example implementation, a user-defined rule may cause the case study to be posted in response to a sales representative creating or closing a sales opportunity in the CRM database. In the former case, the case study may, for example, be generated and posted in response to the sales representative creating a record in the CRM database. In the latter case, the case study may, for example be generated and posted in response to the sales representative changing a status field of the CRM record to "closed."

Which fields of the CRM record corresponding to the potential or closed sale are displayed as elements $904_1$-$904_N$ may be determined based on one or more user-defined rules (e.g., defined by a forum administrator using an interface such as is described with reference to FIG. 12 below). In an example implementation where the case study corresponds to a sales opportunity, selected CRM fields may include, for example: the name of the potential customer, the industry and/or market that the potential customer operates in, the potential product or service to be sold, others entities competing for the potential customer's business, important dates, a narrative field where the sales representative can input miscellaneous information, and/or the like.

The element 908 may comprise one or more tags associated with the case study. In an example implementation, tags associated with the case study may be determined based on one or more user-defined rules (e.g., defined by a forum administrator using an interface such as is described with reference to FIG. 12 below).

The element 910 may when interacted with, bring up a form for submitting a comment/reply to the case study $902_1$. The reply may then be displayed as a second element 902 in the element 912. Each of the remaining elements $902_2$-$902_4$ may be comments/replies to one or more of the case studies and comments/replies in the element 912. For example, in the scenario shown, $902_2$ and $902_4$ are replies to $902_1$, and $902_3$ is a reply to $902_2$.

Figure 10:
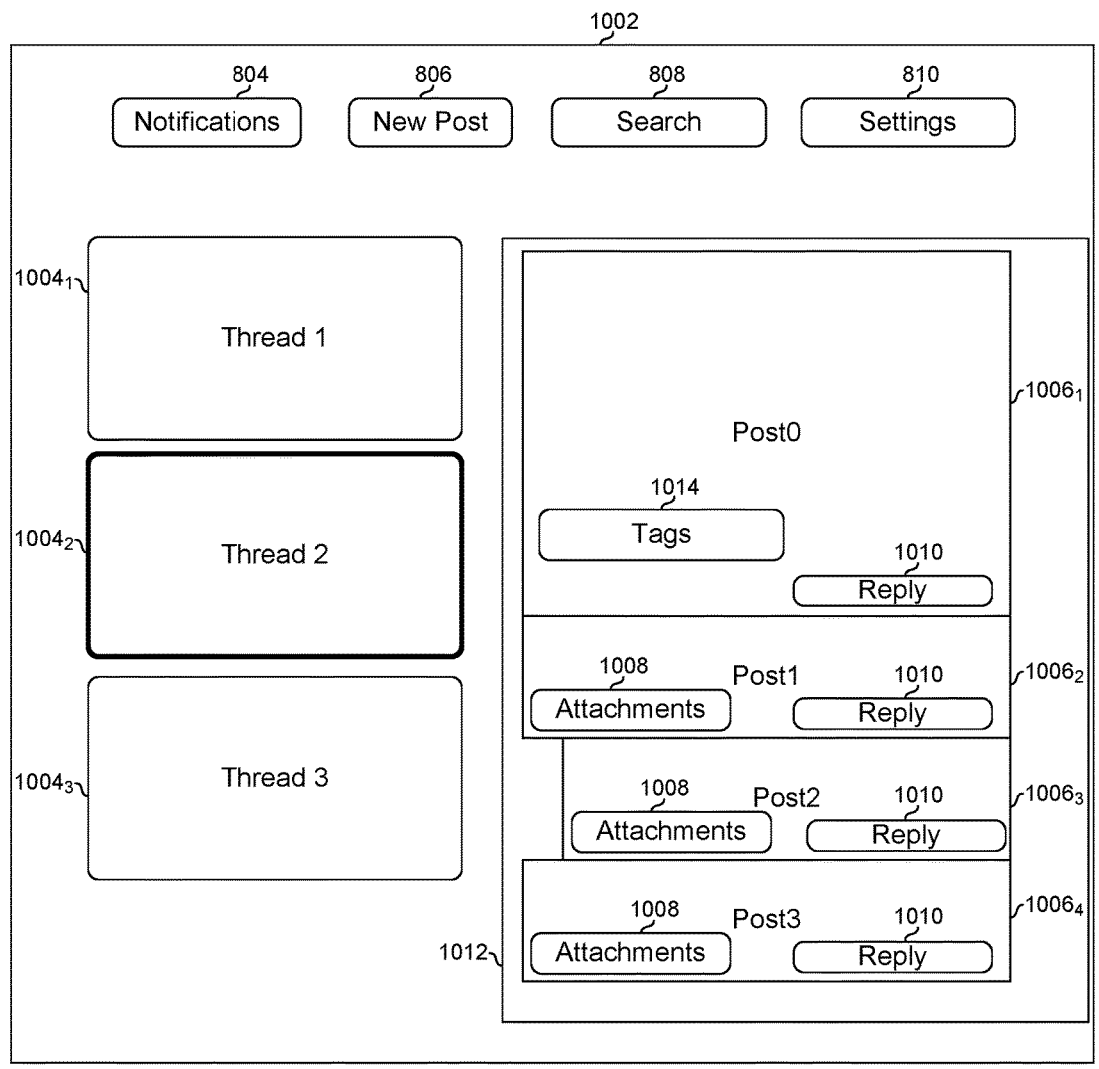

Referring to FIG. 10, there is shown a window 1002 which is similar to the window 902 of FIG. 9. Whereas the window 902 comprises elements pertaining to particular case studies, window 1002 provides a more general discussion forum.

Each of the elements 1004 may correspond to a thread. The element 1012 may comprise elements 1006 corresponding to posts of the selected thread. The element $1006_1$ may correspond to the first post ("Post 0") of the thread. The element 1014 may indicate one or more tags that are associated with the post and/or the selected thread. Which tags are associated with the post may be manually selected by an author of the post and/or may be automatically selected based on the contents of the thread and/or one or more user-defined rules. The elements 1008 and 1010 may be substantially similar to the elements 908 and 910, respectively, of FIG. 9.

Figure 11:
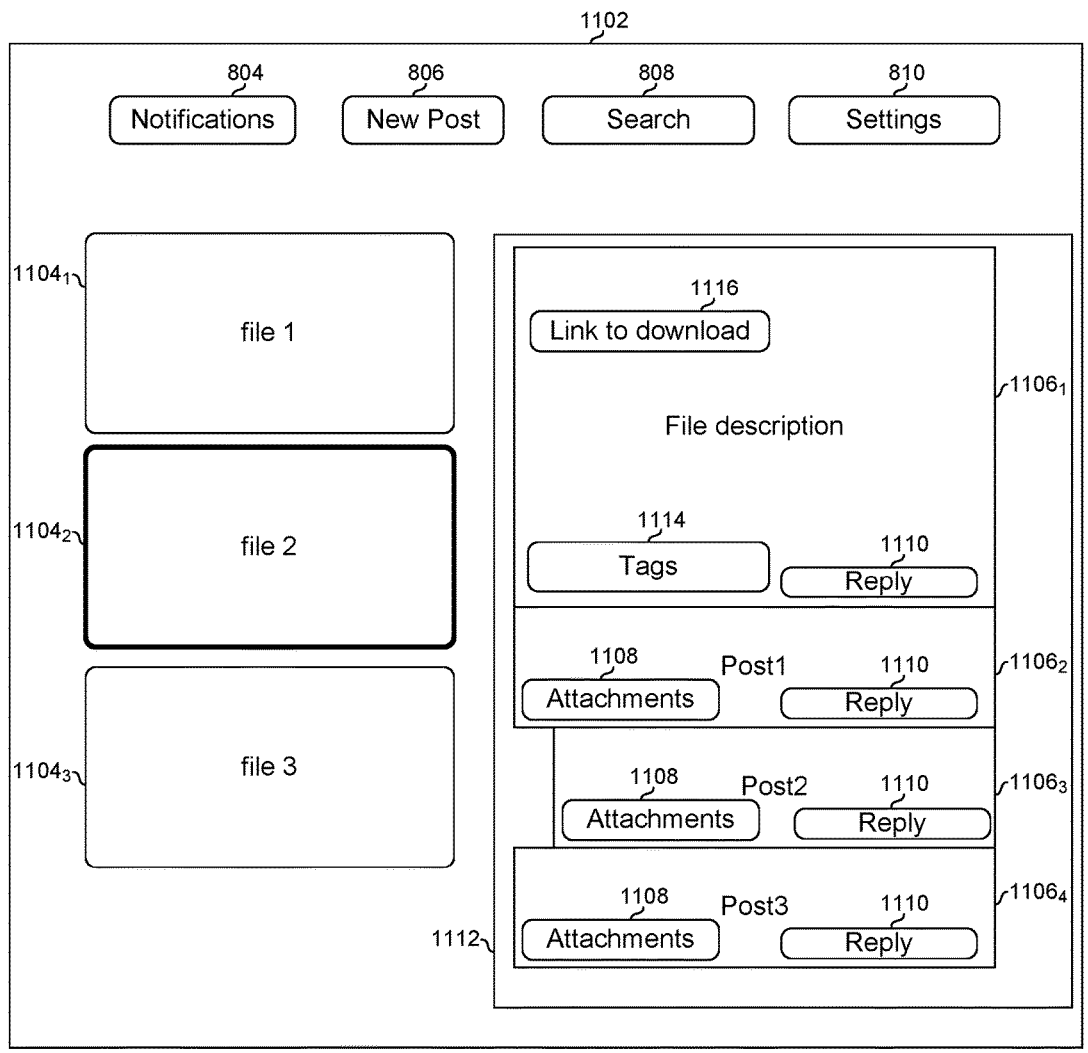

Referring to FIG. 11, there is shown a window 1102 which is similar to the window 1002 of FIG. 10. Whereas the window 1002 comprises elements of a general discussion forum, window 1102 comprises elements corresponding to files associated (e.g., by attaching to posts) with the electronic forum.

Each of the elements 1104 may correspond to a respective file. (i.e., 1104₁ may correspond to a first file, 1104₂ may correspond to a second file, and so on). The element 1112 may comprise elements 1106 corresponding to posts associated with the selected file. The element 1106₁ may correspond to the first post ("Post 0") of the thread. The element 1116 may comprise a link to download the file associated with the thread. The element 1114 may indicate one or more tags that are associated with the file. Which tags are associated with the file may be manually selected by the user who posted the file and/or may be automatically selected based on the contents of the thread to which the file was posted and/or one or more user-defined rules. The elements 1108 and 1110 may be substantially similar to the elements 1008 and 1010, respectively, of FIG. 10. In an example implementation, the files displayed in the window 1102 may be attached to case studies as shown in FIG. 9 and/or threads as shown in FIG. 10. In this regard, the window 1102 may aggregate files from across multiple threads or case studies. In this manner, a user may be enabled, for example, to find related files and/or particular versions a file.

Figure 12:
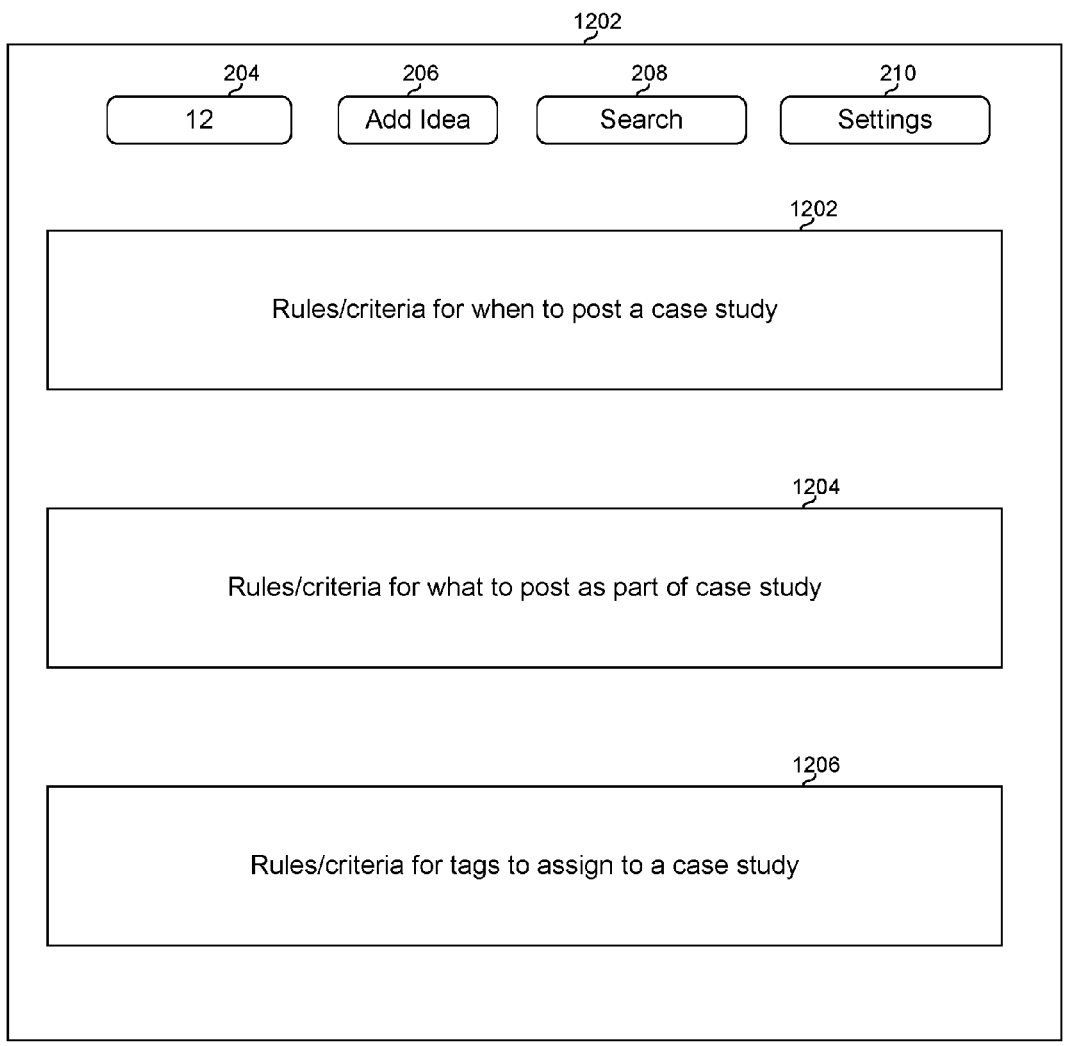

FIG. 12 depicts an example user interface for creation of user-defined rules pertaining to the generation and posting of case studies. The depicted window comprises an element 1202 for defining rules as to when case studies are to be generated and posted to the forum, an element 1204 for defining rules as to what contents to include in a generated case study, and an element 1206 for defining rules as to what tags are to be associated with a generated case study.

The element 1202 may comprise elements such as, for example, drop-down menus, check boxes, text boxes, and/or the like for a user (e.g., a forum administrator) to define rules as to when case studies are to be generated and posted to the forum. In an example implementation, the element 1202 may comprise elements for selecting one or more fields of the CRM database and defining logic expressions based on the contents of the selected field(s). For example, a rule that a case study should be created upon closing of a sales opportunity (i.e., create case study when contents of a status field in the CRM is set to "closed") may be defined by selecting a "status" field via a first checkbox or drop-down menu, selecting the logic expression "is equal to" via a second checkbox or drop-down menu, and selecting "closed" via a third checkbox or drop-down menu.

The element 1204 may comprise elements such as, for example, drop-down menus, check boxes, text boxes, and/or the like for a user (e.g., a forum administrator) to define rules for what content to include in case studies. In an example implementation, the element 1204 may list each of a plurality of CRM fields and the user may be enabled to check which of the fields to include in generated case studies.

The element 1206 may comprise elements such as, for example, drop-down menus, check boxes, text boxes, and/or the like for a user (e.g., a forum administrator) to define rules for what tags to associate with generated case studies. In an example implementation, the element 1206 may list each of a plurality of CRM fields and the user may be enabled to check which of the fields should be converted to tags. For example, where a particular CRM field is selected in element 1206, a generated case study may be tagged with the contents of the selected field.

Figure 13:
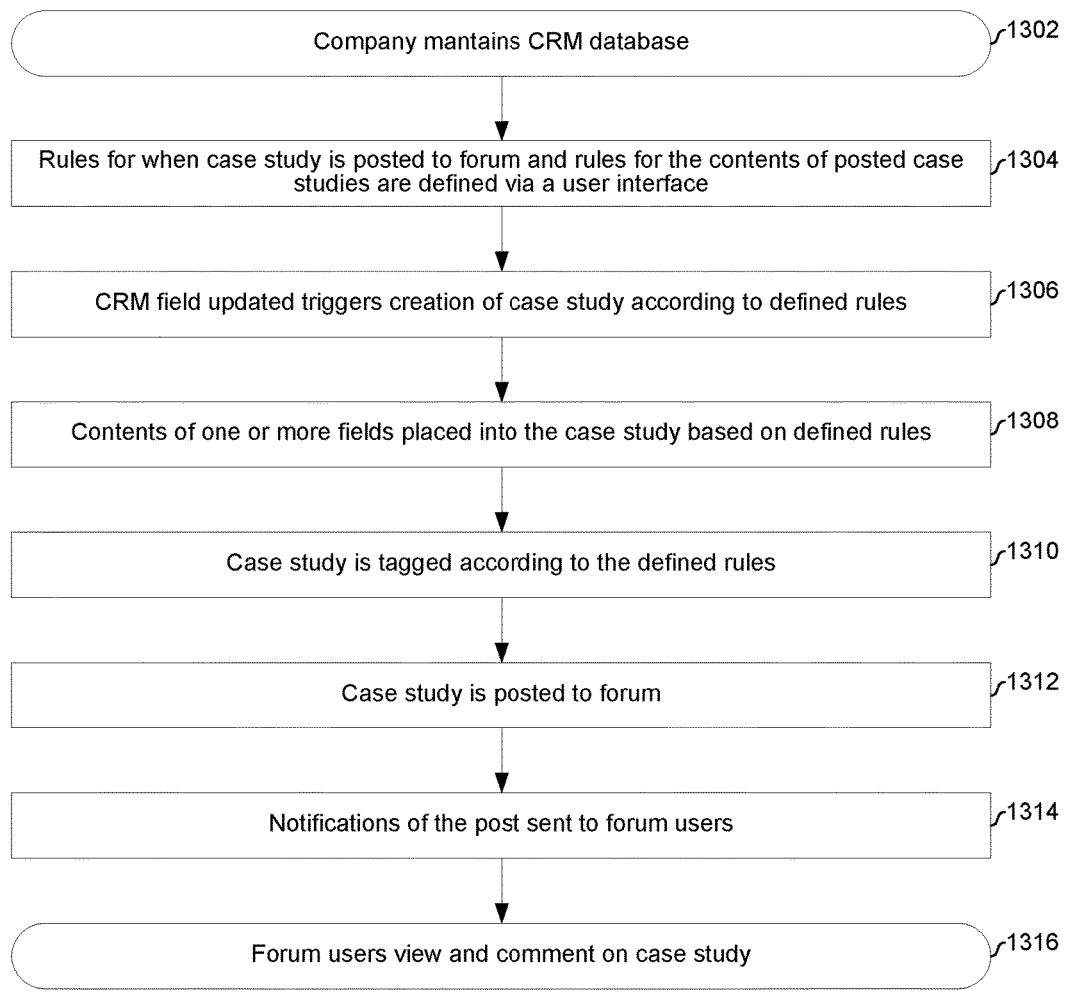
FIG. 13 is a flowchart illustrating an exemplary process performed by a system for customer relationship management and collaboration.

FIG. 13 is a flowchart illustrating an exemplary process performed by a system for customer relationship management and collaboration. The process begins with block 1302 when a company has set-up a CRM database and is using it for managing data.

In block 1305, rules for when case studies are to be posted to the electronic forum, and rules for the contents of the posted case studies, are defined by a user (e.g., a forum administrator) using an interface such as the one described with reference to FIG. 6.

In block 1306, an update of a CRM field triggers the creation and posting of a case study, in accordance with the rules defined in block 1304. For example, a sales representative changing a sales opportunity status field to "closed" may trigger the creation of the case study.

In block 1308, the case study is generated with its contents populated with the contents of one or more CRM fields, in accordance with the rules defined in block 1304. For example, the case study may be populated with the contents of "customer name" field, a "customer industry" field, a "customer markets" field, a "narrative" field, and/or any other fields of the CRM database which may enable the case study to be used as a training/learning tool for closing future sales opportunities.

In block 1310, the case study is tagged with one or more tags selected according to the rules defined in block 1304. For example, the case study may tagged with a tag that corresponds to the industry of the closed sales opportunity.

In block 1312, the case study is posted to the electronic forum. For example, the case study is posted as the first post of a new thread that is categorized according to one or more of the CRM fields included in the case study.

In block 1314, a notification (e.g., SMS, MMS, email, intra-forum message, etc.) is sent to forum users whose account information indicates an interest and/or association with the case study (e.g., based on its contents and/or tags). For example, for a case study corresponding to a closed sales opportunity, a notification may be sent to other sales representatives working in related industries or with similar clients. As another example, to whom a notification of a case study is sent may be determined by a company's organizational structure (e.g., sent to particular departments, to a manager's direct reports, etc.). In block 1316, users of the forum login and view the case study. Additionally, the users may post comments/replies to the case study (e.g., share similar experiences or suggestions, ask questions pertaining to the case study, etc.)

Figure 14:
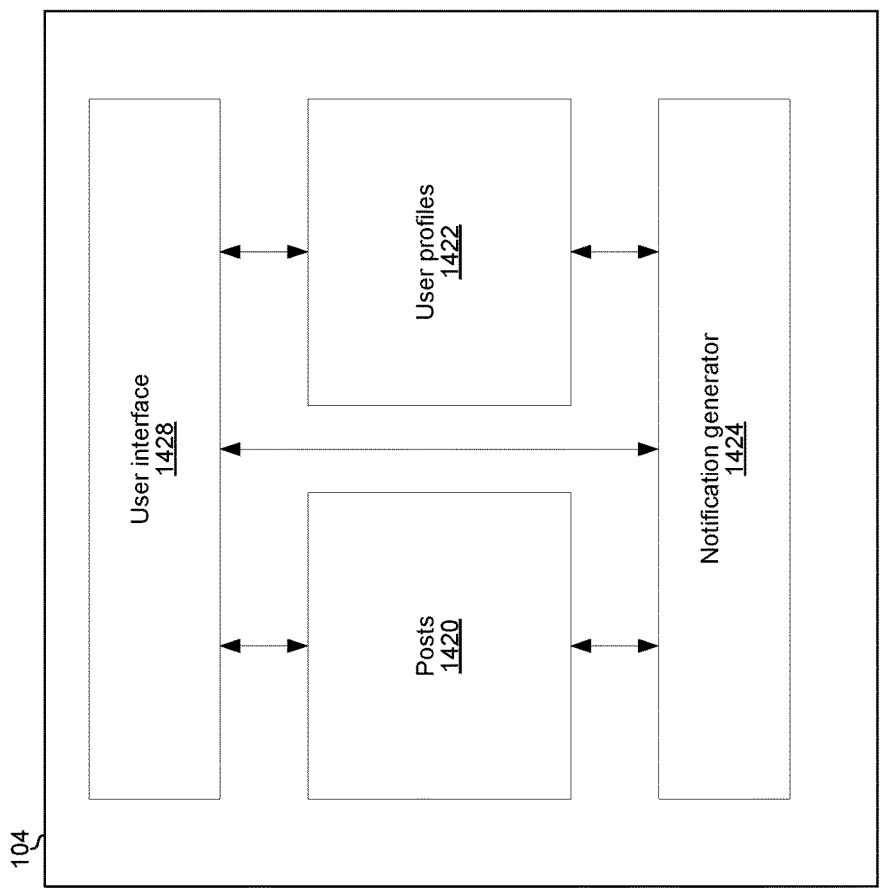
FIG. 14 is a high-level block diagram of a device that hosts an electronic forum in accordance with an example implementation of this disclosure.

FIG. 14 is a high-level block diagram of a device that hosts an electronic forum in accordance with an example implementation of this disclosure. In the example implementation shown, the device 104 comprises memory 1420 which stores posts of the electronic forum, memory 1422 which stores user profiles of the electronic forum, notification generation circuitry 1424, and user interface circuitry 1428.

The user interface circuitry 1428 is operable to act as an intermediary between the device 104 and client devices 106 accessing the electronic forum. The user interface circuitry 1428 may, for example, operate as a web or application server which retrieves raw data from memory, formats it into user interface elements of a user interface of the electronic forum (e.g., encapsulates it with appropriate HTML tags), and then serves it to a client (e.g., a web browser running locally on device 104 or remote on a device 106).

The notification generation circuitry 1424 is operable to parse the user profile data in memory 1422 to identify the tags, mentions, and/or combinations of tags and/or mentions (referred to herein simply as "combinations") to which users of the electronic forum are subscribed. The notification generation circuitry 1424 is also operable to monitor the memory for new posts, and upon detecting creation of a new post, automatically inspect the post for occurrence(s) of the subscribed-to tags, mentions, and/or combinations. In response to detecting an occurrence of a subscribed-to tag, mention, or combination, the notification generation circuitry 1424 may automatically notify the user(s) who are subscribed-to the detected tag, mention, or combination. In an example implementation, different users may have different permissions for different posts. In such an implementation, prior to notifying a user that a post has been created containing one of his/her subscribed-to tags, mentions, or combinations, the notification generation circuitry 1424 first determine (based on the post data and the user profile data) whether the user has permission to view the post. If so, then the notification is sent. If not, then the notification may not be sent. In an example implementation, where the user does not have permission, the notification generation circuitry 1424 may notify an owner/creator of the post or the thread in which the post was created to query whether the owner/creator wants to grant the user permission to view the post. In this regard, upon learning that the user is interested in tags, mentions, and/or combinations occurring in the post, the owner/creator may want to grant the user permission. In this manner, such notifications may provide for greater connectivity among users of the electronic forum and increased information sharing among users of the users of the electronic forum.

Figure 15A:
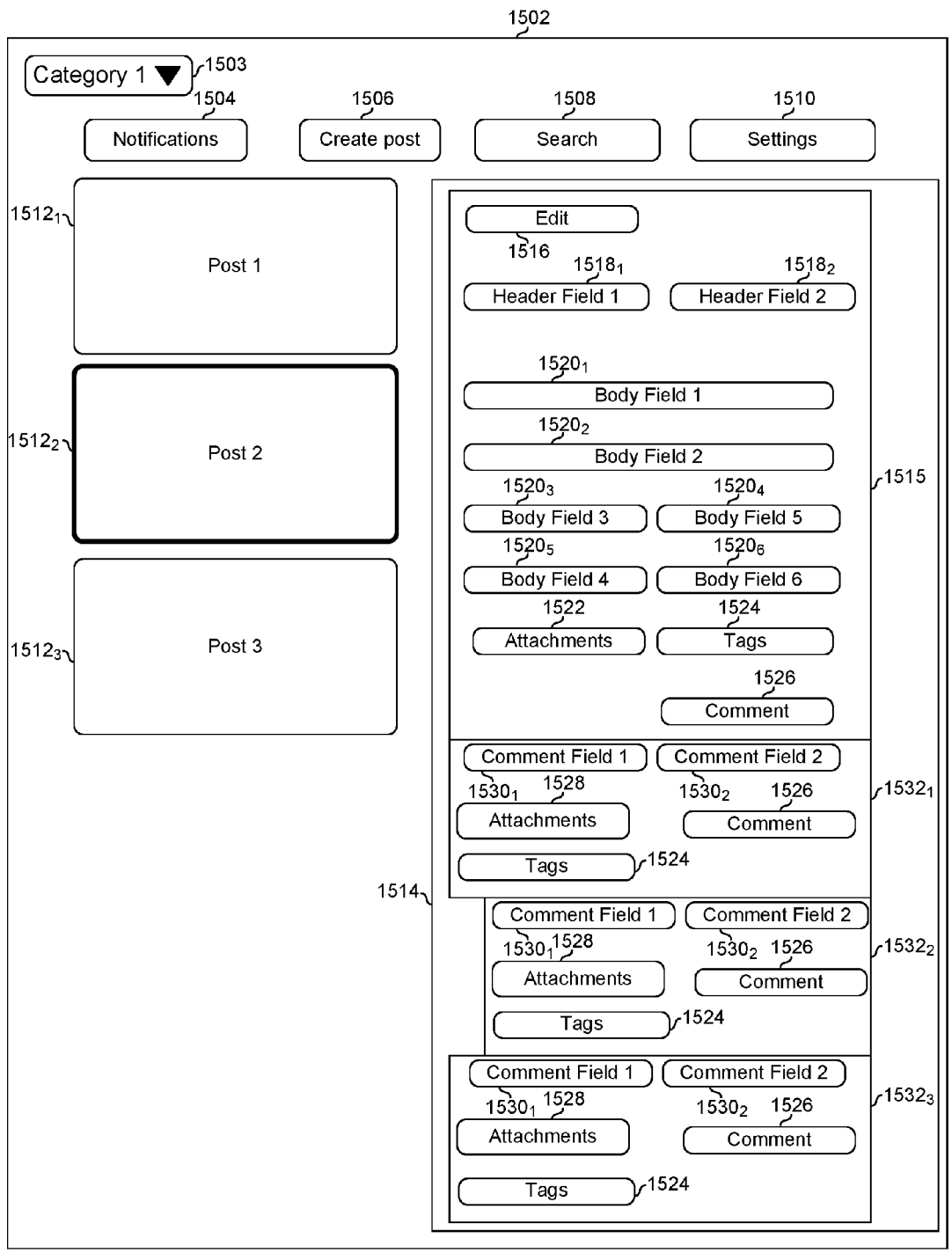
FIGS. 15A-15C show an example user interface of an electronic forum.
Figure 15B:
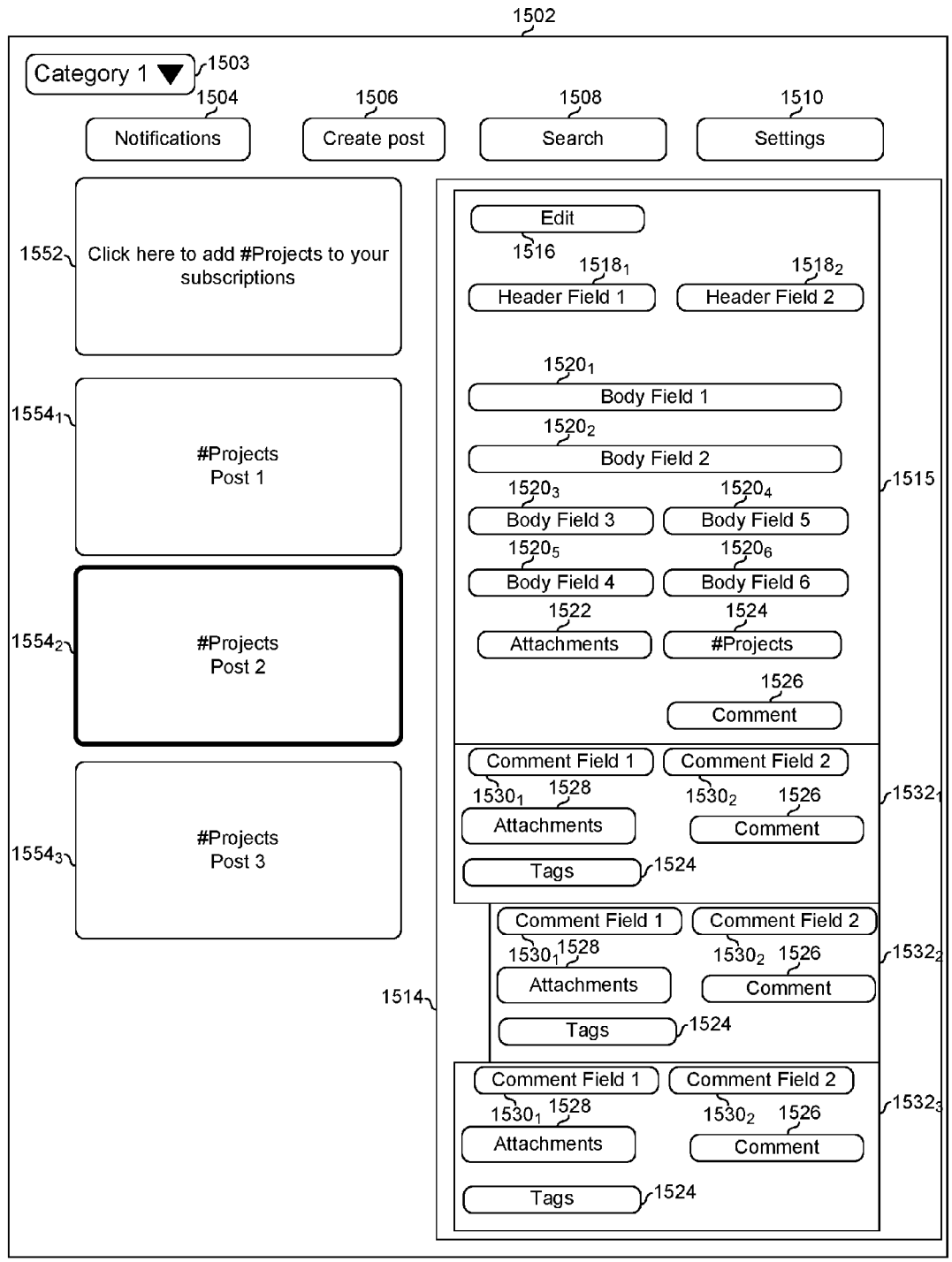
Figure 15C:
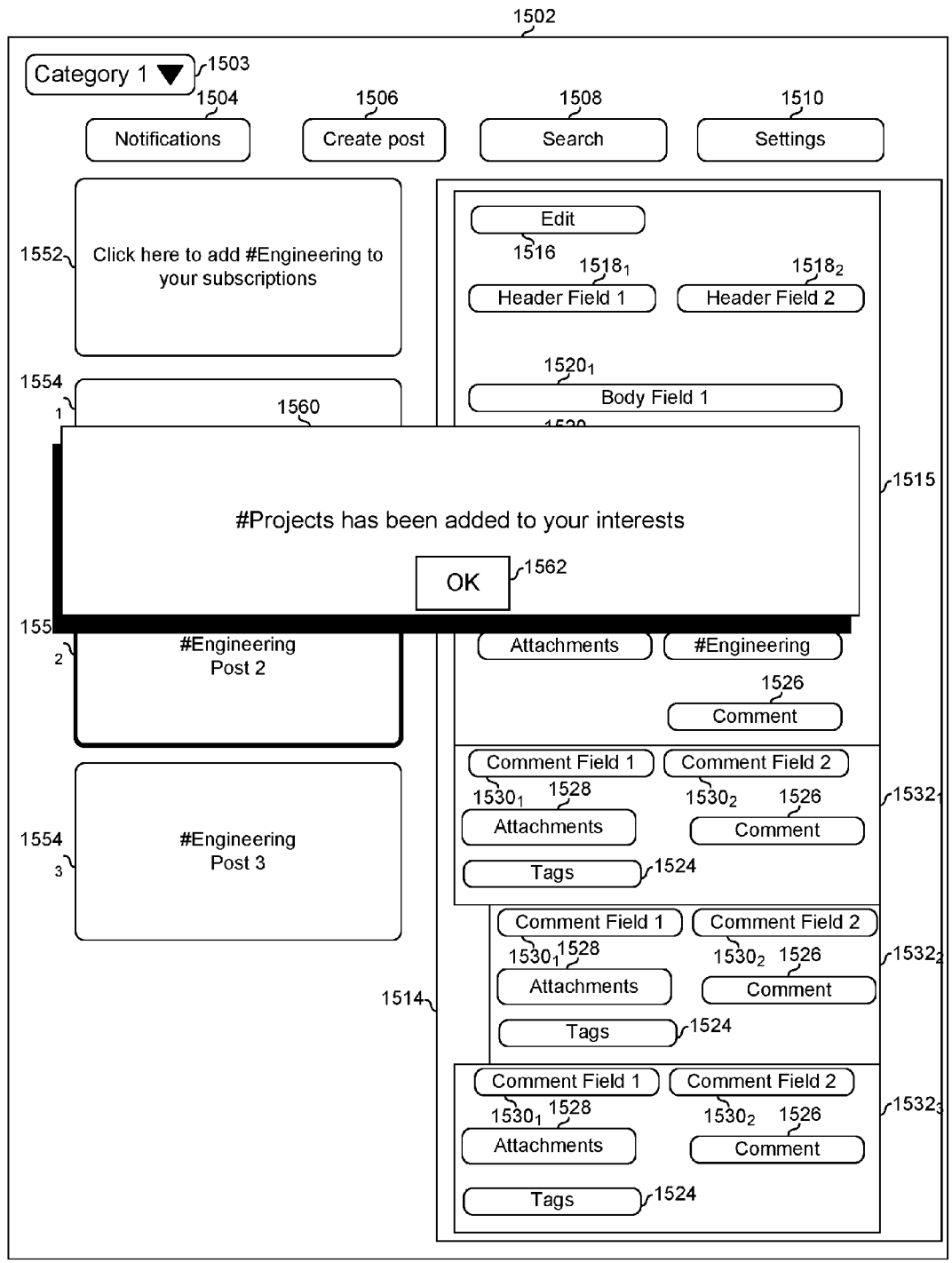

FIG. 15A depicts an example user interface of an electronic forum in which a first example post is selected for display. The window/screen 1502 may, for example, be presented on a monitor of device 106a and be interacted with via a mouse and keyboard of the device 106a. The example window/screen 1502 comprises a plurality of interface elements each which may be hyperlinks, text boxes, drop down menus, and/or the like.

Posts in the electronic forum may be categorized. Interface element 1503 may enable a user of the forum to select a category of posts to view. For example, when interacted with, element 1503 bring up a drop down list of categories to choose from. Examples below refer to a "real estate" category, but any category is possible.

When interacted with (e.g., touched, clicked, or the like), element 1504, brings up an interface element (e.g., a "window") in which notifications for the user are displayed (e.g., an "inbox" of messages, statuses, and the like pertaining to activity in the forum). In an example implementation, such notifications may be generated in response to creation of a post containing a subscribed-to tag, mention, or combination When interacted with, element 1506 brings up a post creation form for creating a new post. Upon submission of the form, a thread and/or post may be created in the electronic forum and other users may be enabled to view and reply to the post. Details of example post creation forms are described below with reference to FIGS. 18A-18C.

When interacted with, element 1508 brings up a search form for searching posts (including, for example, body fields, attachments, tags, etc.), comments, and/or any other contents of the forum and other users may be enabled to view and reply to the post. Details of example post search forms are described below with reference to FIGS. 19A-19B.

When interacted with, element 1510 brings up a user window for configuring the user's profile and/or preferences. Interface elements 1504-1510 may be part of a "navigation bar" of the window/screen 1502.

Each of the interface elements $1512_1$-$1512_3$ corresponds to an existing post ("Post 1," "Post 2," and "Post 3," respectively) stored in the electronic forum. Each of the posts may have been generated, for example, in response to a user filling out and submitting a post creation form.

The element 1514 is a container for interface elements that correspond to the selected one of elements 1512. For illustration, in FIG. 15 element $1512_2$ is selected (as indicated by the bold line around $1512_2$) and, therefore, in FIG. 15 element 1514 contains information elements corresponding to Post 2.

The information corresponding to a post in the electronic forum may be stored, for example, in a data structure such as a table, a database, or the like. Accordingly, in an example implementation, generation of the element 1514 for Post 2 may comprise the following: (1) in response to element $1512_2$ being selected (e.g., touched or clicked) on a client device viewing the forum (e.g., in a web browser or native app) a database record corresponding to Post 2 is fetched; (2) the record is parsed to recover components of Post 2 (which may include, for example, metadata/header fields of Post 2, content of Post 2, and/or other information); (3) an HTML file corresponding to the interface elements for presenting the retrieved components of Post 2 is generated based on the components of the post and the information from the form used to create the post; (4) the HTML file is transmitted to the client device; and (5) the HTML file is rendered for presentation on a monitor (e.g., using an applicable cascaded style sheet (CSS) file).

In an example implementation, a database record corresponding to a post in the electronic forum may comprise one or more first fields which may be populated with metadata/header information and a second field which may be populated with the contents of the post (which may include, for example, body fields, links to attachments, tags, and/or other information). The contents may be stored as structured text (e.g., in JavaScript Object Notation (JSON) form, XML format, or the like). A non-limiting example is shown below in Table 1.

TABLE 1

| Post ID | Content of Post |
|---------|-----------------|
| Post 3 | "Form 2":{<br>"Header Field 1":{"value":"[Author's Name]", "name":"Header Field 1"},<br>"Header Field 2":{"value":"[Date of Post 3]", "name":"Header Field 2"},<br>"Body Field 1":{"value":"[user input to $1520_1$ of form $318_1$]","name":"Body Field 1"},<br>"Body Field 2":{"value":"[user input to $1520_2$ of form $318_2$]","name":"Body Field 2"},<br>"Attachments":{"value":"[path input to 343 of form $318_2$)]","name":"Attachments"},<br>"Tags":{"value":"[tag(s) based on Form 2 tag rule(s)]", "name":"Tags"}<br>} |

The interface element 1514 comprises an interface element 1515 corresponding to the selected post (Post 2 in FIG. 15A), and one or more interface elements 1532 corresponding to comments to the selected post. In the example of FIG. 15, where Post 2 is selected, the interface element 1514 comprises an element 1515 and comment elements $1532_1$-$1532_3$. The element 1515 comprises an edit element 1516, header field elements $1518_1$-$1518_2$, body field elements $1520_1$-$1520_6$, one or more attachment elements 1522, one or more tags elements 1524, and a comment element 1526.

Each of the comment elements $1532_1$-$1532_3$ comprises elements $1530_1$ and $1530_2$, an attachments element 1528, and an element 1526.

When interacted with, the edit element 1516 may bring up a form for editing Post 2. Upon submission of the form, the underlying structured data of Post 2 may be retrieved from memory (e.g., a database record associated with Post 2 may be retrieved, and the contents of the record may be parsed), updated to reflect the edits input via the form, and stored back to memory (e.g., overwriting the database record, adding to the database record, or creating a new database record). The window/screen 1502 may then be refreshed to display the updated version of Post 2. Details of example post-editing forms are described below with reference to FIGS. 21A and 21B.

Each of the header field elements $1518_1$ and $1518_2$ may present information about Post 2 that was not necessarily manually entered into the post creation form that generated Post 2, but is nevertheless associated with Post 2. For example, the metadata/header fields may present metadata associated with Post 2 such as a name of the author of Post 2, the time at which Post 2 was created, the time at which Post 2 was last edited, whether Post 2 has attachments, and/or the like.

Each of the body field elements $1520_1$-$1520_6$ may present information entered into a field of the post creation form used to generate Post 2.

The attachment elements 1522 may present hyperlinks to, or in-line renderings of, files (e.g., images, text files, pdf files, and/or the like) attached to Post 2 by its author.

The tags element 1524 may present one or more tags associated with the post presented in element 1515. The tags may be presented as hyperlinks that, when interacted with, trigger a search for other posts tagged with the same or similar tag and/or trigger presentation of an interface element for subscribing to the selected tag. In an example implementation, tags associated with Post 2 may be determined based on one or more tag generation rules associated with the post creation form used for generating Post 2, as, for example, discussed below with reference to FIGS. 18A-18C.

The comment element 1526 may, when interacted with, bring up a form for submitting a comment on Post 2. The comment may then be displayed in a corresponding element 1532. In this regard, each of the elements $1532_1$ and $1532_3$ may present a comment on Post 2 that was submitted either by the author of Post 2 or another user of the electronic forum who has access to Post 2.

For each element $1532_X$ (X representing here a value between 1 and 3 in FIG. 15A), each comment field elements $1530_Y$ (Y representing here a value between 1 and 2 in FIG. 15A) may present header/metadata information associated with comment displayed in element $1532_X$ and/or may present information entered into the comment generation form used to generate the comment element $1532_X$. Details of example comment generation forms are described below with reference to FIGS. 20A and 20B.

For each element $1532_X$, the attachment element may present, for example, hyperlinks to, or in-line renderings of, files (e.g., images, text files, pdf files, and/or the like) attached to the comment presented in element $1532_X$ by the comment's author.

For each element $1532_X$, the comment element 1526 may, when interacted with, bring up a form for submitting a comment on the comment shown in element $1532_X$. The comment may then be displayed in an element $1532_Y$ (Y representing here any value not equal to X). For example, the element $1532_2$ presents a comment on the comment shown in element $1532_1$.

As a non-limiting example to help illustrate the various fields of Post 2, assume that the category selected in element 1503 is "real estate" and that Post 2 is a post regarding a house for sale. For example, Post 2 may have been created using a "Pocket Listing" post creation form selected using element 1506. In such an implementation, the header fields 1518 may present, for example: (1) the name of the realtor/user of the electronic forum that created Post 2; and (2) the timestamp that Post 2 was created. In such an implementation, the body fields 220 may present, for example: (1) the neighborhood of the house; (2) number of bedrooms in the house; (3) the number of bathrooms in the house; (4) the square footage of the house; (5) the price of the house; and (6) whether parking is included. In such an implementation, pictures of the house may be attached to Post 2 and presented in element 1522. In such an implementation, the comment fields 1532 may present, for example, (1) author of the comment; and (2) a question about the house (e.g., from an author other than the author of Post 2) or additional information about the house (e.g., from the author of Post 2 in response to a question in a previous comment).

Now referring to FIG. 15B, again shown is the screen 1502 but this time, for illustration, an example tag of #Projects is shown in the tags element 1524 of Post 2. As a result of a user selecting the #Projects tag, interface elements 1552 and $1554_1$-$1554_3$ are presented. Each of user interface elements $1554_1$-$1554_3$ correspond to a post containing #Projects. That is, upon clicking #Projects in element 1515 a search of other posts in the electronic forum that contain #Projects was triggered. Each search hit that the user has permission to view is then presented as an interface element 1554. Thus, in the example shown, there are three other posts containing #Projects that the user has permission to view. Selection of one of the elements 1554 causes the corresponding post and comments to be displayed in element 1515 the same as Post 2 is displayed in FIG. 15A.

In response to the user selecting the interface element 1552, the user is subscribed to #Projects and a dialog box 1560 (shown in FIG. 15C) may be displayed to notify the user of the subscription. The user can clear away the dialog box by selecting interface element 1562.

Figure 16:
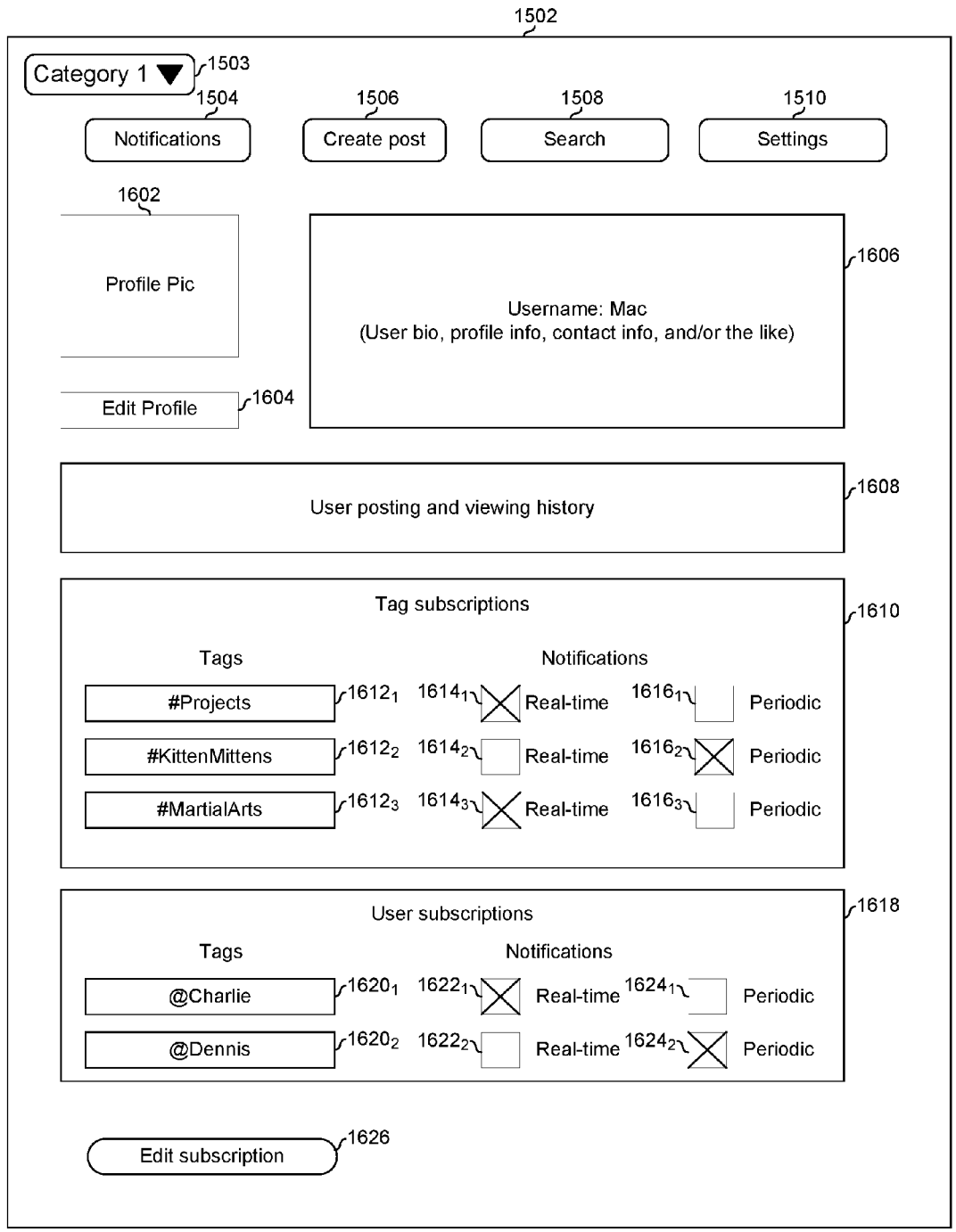
FIG. 16 shows an example user profile screen of the electronic forum.

FIG. 16 shows an example user profile screen of the electronic forum. The screen is for an example user "Mac" and may be displayed in response to selection of interface element 1510. The user profile screen comprises a profile picture interface element 1602, user info element 1606, element 1604 for triggering a profile editing interface, element 1608 presenting the user's historical activity in the electronic forum, interface element 1610 presenting the user's tag subscriptions, interface element.

The interface element 1608 may present, for example, past posts made by the user, past comments made by Mac, past posts viewed by Mac, past searches performed by Mac, and/or the like.

The interface element 1610 comprises a plurality of interface elements 1612, each of which corresponds to a tag the Mac is subscribed to. For each subscribed-to tag, Mac may select either a corresponding interface element 1614 to have notifications for that tag sent in real-time (i.e., as soon as possible after creation of a post from, or referencing, the subscribed-to user), or an interface element 1616 to have notifications of such posts sent periodically (e.g., hourly, daily, weekly, etc.).

The interface element 1618 comprises a plurality of interface elements 1620, each of which corresponds to another user of the electronic forum to whom Mac is subscribed. For each subscribed-to user, Mac may receive notifications when the subscribed-to user creates a post in the forum and/or when a post contains a "mention" of the subscribed-to user is created by a third user in the forum. For each subscribed-to user, Mac may select either a corresponding interface element 1622 to have notifications for the subscribed-to user sent in real-time (i.e., as soon as possible after creation of a post from, or referencing, the subscribed-to user), or an interface element 1624 to have notifications of such posts sent periodically (e.g., hourly, daily, weekly, etc.). In an example implementation, mentions and tags may be differentiated by use of one or more distinguishing alphanumeric characters. For example, tags may begin with the pound sign (#) and mentions may begin with the at sign (@). In such an implementation, #Mac would then be a tag that does not necessarily pertain to the electronic forum user Mac, whereas a mention of @Mac would definitely pertain to the electronic forum user Mac.

Upon being selected, the interface element 1626 may trigger presentation of a user interface for Mac to add and/or remove tag and/or user subscriptions. In an example implementation, such a user interface may provide for crafting more advanced subscriptions using tags, mentions, and/or Boolean search terms. For example, Mac may be enabled to setup a subscription to be notified of posts that contain both a mention of @Dee and the tag #Paddy's.

Figure 17:
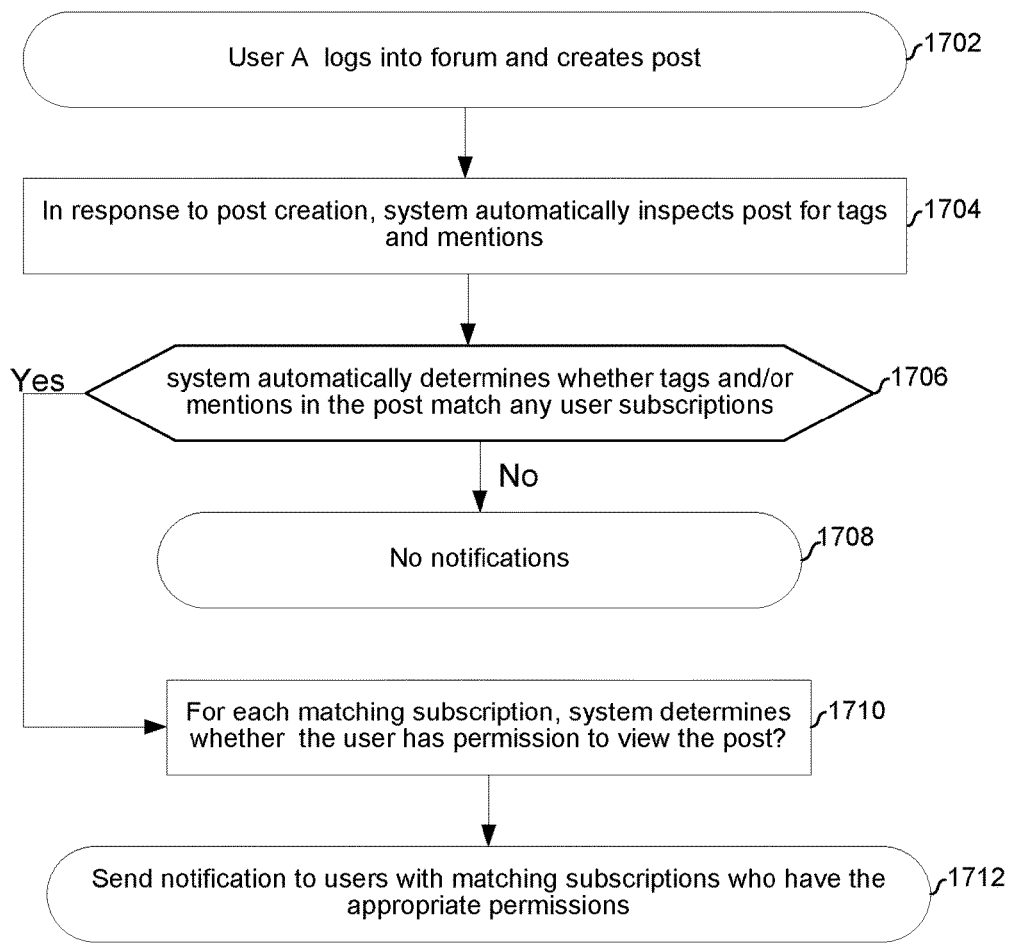
FIG. 17 is a flowchart illustrating an example process for real-time, interest-based notifications, in accordance with an example implementation of this disclosure.

FIG. 17 is a flowchart illustrating an example process for real-time, interest-based notifications, in accordance with an example implementation of this disclosure. In block 1702, User A logs into the electronic forum and creates a post containing the tag #Projects. In block 1704, in response to the post creation in block 1702, the system hosting the electronic forum automatically inspects (without user input required to trigger the inspection) the post to detect whether it contains any tags and/or mentions. In block 1706, the system automatically determines (without user input required to trigger the determination) whether any tags and/or mentions in the post meet the tag, user, and/or combination subscriptions of any users of the electronic forum. If not, then in block 1708 no notifications are sent.

Returning to block 1706, if the tags and/or mentions in the post do match at least one subscription, then the process advances to block 1710. In block 1710, for each matching subscription, the system determines whether the user associated with the subscription has permission to view the post. Then, in block 1712, the system sends a notification of the post to any users having a matching subscription and appropriate permissions.

In accordance with an example implementation of this disclosure, a system which hosts an electronic forum comprises: memory (e.g., 1420) in which is stored profiles of users of the electronic forum, memory (e.g., 1422) in which is stored posts of the electronic forum, and notification generation circuitry (e.g., 1424). The notification generation circuitry is operable to, automatically in response to creation of a post to the electronic forum, inspect the post for an occurrence of a particular tag. The notification generation circuit is operable to determine, automatically in response to a detection that the post contains an occurrence of the particular tag, which of the users are both subscribed to the particular tag and have permission to view the post; and send, automatically in response to a determination that a first one or more of the users are both subscribed to the particular tag and have permission to view the post, a notification of the post to the first one or more of the users.

The system may also comprise user interface circuitry (e.g., 1428). The user interface circuitry may be operable to serve user interface elements (e.g., elements contained in 1514 of FIG. 15A) corresponding to the post (e.g., Post 2 of FIG. 15A), wherein one of the user interface elements (e.g., 1424) comprises text of the particular tag (e.g., the text "#Projects"). The user interface circuitry may be operable to, in response to a user selecting the one of the user interface elements, serve a user interface element (e.g., 1552) via which the user can subscribe to the particular tag. The user interface circuitry and the notification generation circuitry may be operable to in response to a user interface selecting the one of the user interface elements, search for other posts of the electronic forum which contain the particular tag, and present user interface elements (e.g., $1554_1$-$1554_3$) corresponding to the other posts of the electronic forum which contain the particular tag. The automatic send of the notification may as soon as possible after the creation of the post (e.g., as soon as processing and/or network resources are available to perform the inspection, determination, and send). In some instances this may result in the notification be sent within, for example, 10 seconds of the creation of the post. In some instances this may result in the notification be sent within, for example, 10 minutes of the creation of the post.

The notification generation circuitry may be operable to inspect the post, automatically in response to the creation of the post, for a mention of a particular user of the users (e.g., look for @Dennis for a user of the electronic system having the username Dennis). The notification generation circuitry may be operable to determine, automatically in response to a detection that the post contains a mention of the particular user, which of the users are both subscribed to the particular one of the users and have permission to view the post. The notification generation circuitry may be operable to send, automatically in response to a determination that a second one or more of the users are both subscribed to the particular user and have permission to view the post, a notification of the post to the second one or more of the users. In this example implementation, all tags in the posts of the electronic forum, including the particular tag in the post, begin with a first one or more alphanumeric characters (e.g., the pound sign), and all mentions in the posts of the electronic forum, including the mention of the particular user in the post, begin with a second one or more alphanumeric characters (e.g., the at sign) different than the first one or more alphanumeric characters.

Now referring to FIG. 15D, again shown is the window 1502 but this time with element $1512_3$ selected. Accordingly, in FIG. 15D the element 1514 contains interface elements presenting Post 3. These elements including the post itself in element 1515 and comments to the post in elements $1532_1$-$1532_3$. As a non-limiting example for illustration, it is assumed that Post 3 is a different type of post than Post 2. For example, Post 3 may have been created using a different post creation form than the post creation form used to create Post 2, as discussed below with reference to FIGS. 18A-18C.

The element 1515 in Post 3 comprises one or more each of: edit element 1516, header field element 1518, body field element 1520, attachment element 1522, tags element 1524, and comment element 1526. Each of these elements may be as described above with reference to FIG. 15A. The difference in the number of elements and the information presented in the elements may be a result of different post creation forms being used to generate the two posts.

As a non-limiting example to help illustrate the various fields of Post 3, assume that the category selected in element 1503 is "real estate" and that Post 3 is a general post regarding the real estate market. For example, Post 3 may have been created with a "Discussion" post creation form selected via element 1506. In such an implementation, the header fields 1518 may present, for example: (1) the name of the realtor who created Post 2; and (2) the timestamp that Post 2 was created. In such an implementation, the body fields 1520 may present, for example: (1) the title of the post; (2) the text of the post. In such an implementation, a recent real-estate-related article (or other attachment) may be attached to Post 3 and presented via element 1522. In such an implementation, the comment fields 1532 may present, for example, (1) author of the comment; and (2) a comment on the text or the post and/or the attached article.

Figure 15D:
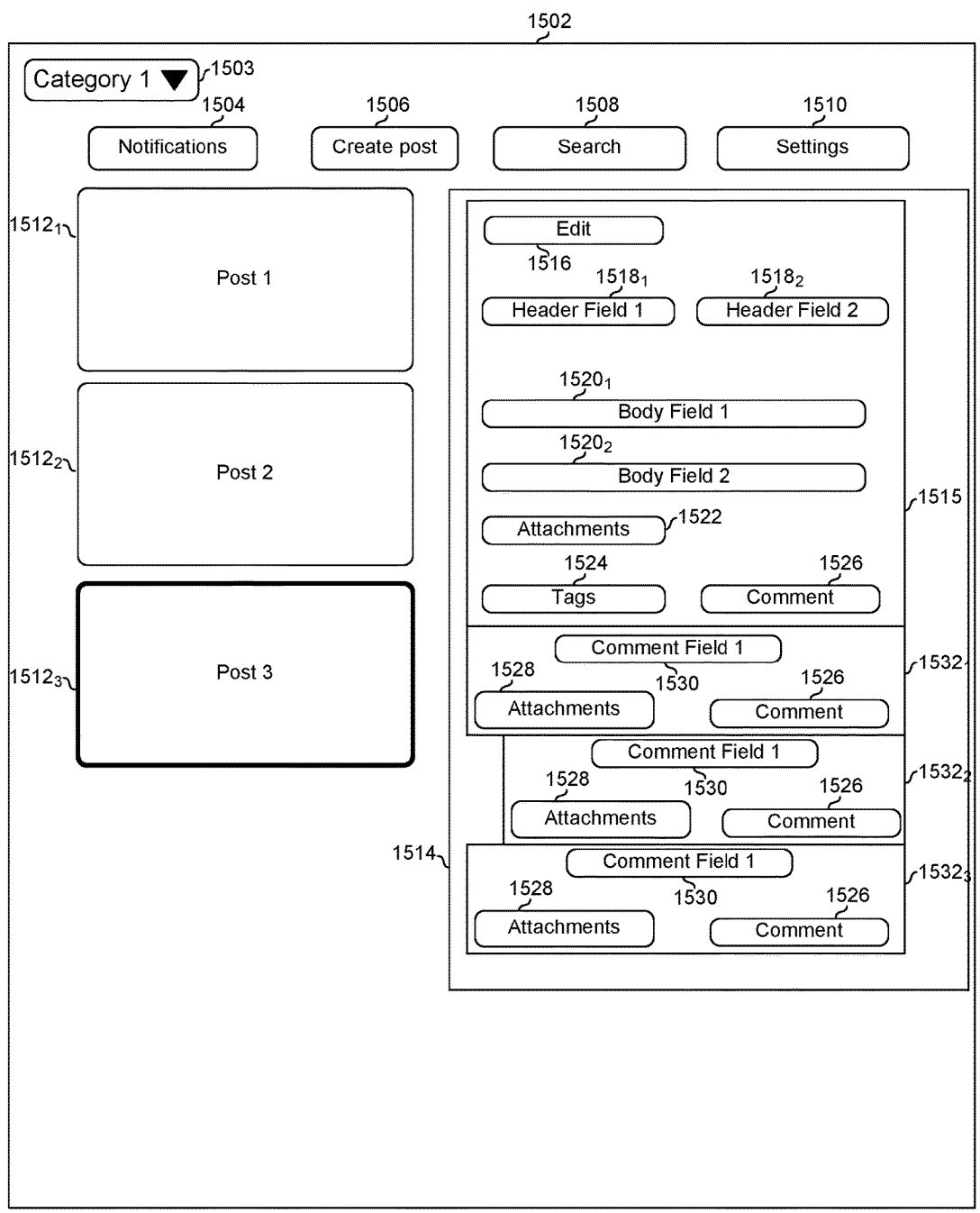
FIG. 15D depicts an example screen of an electronic forum in which a second example post is selected for display.
Figure 18A:
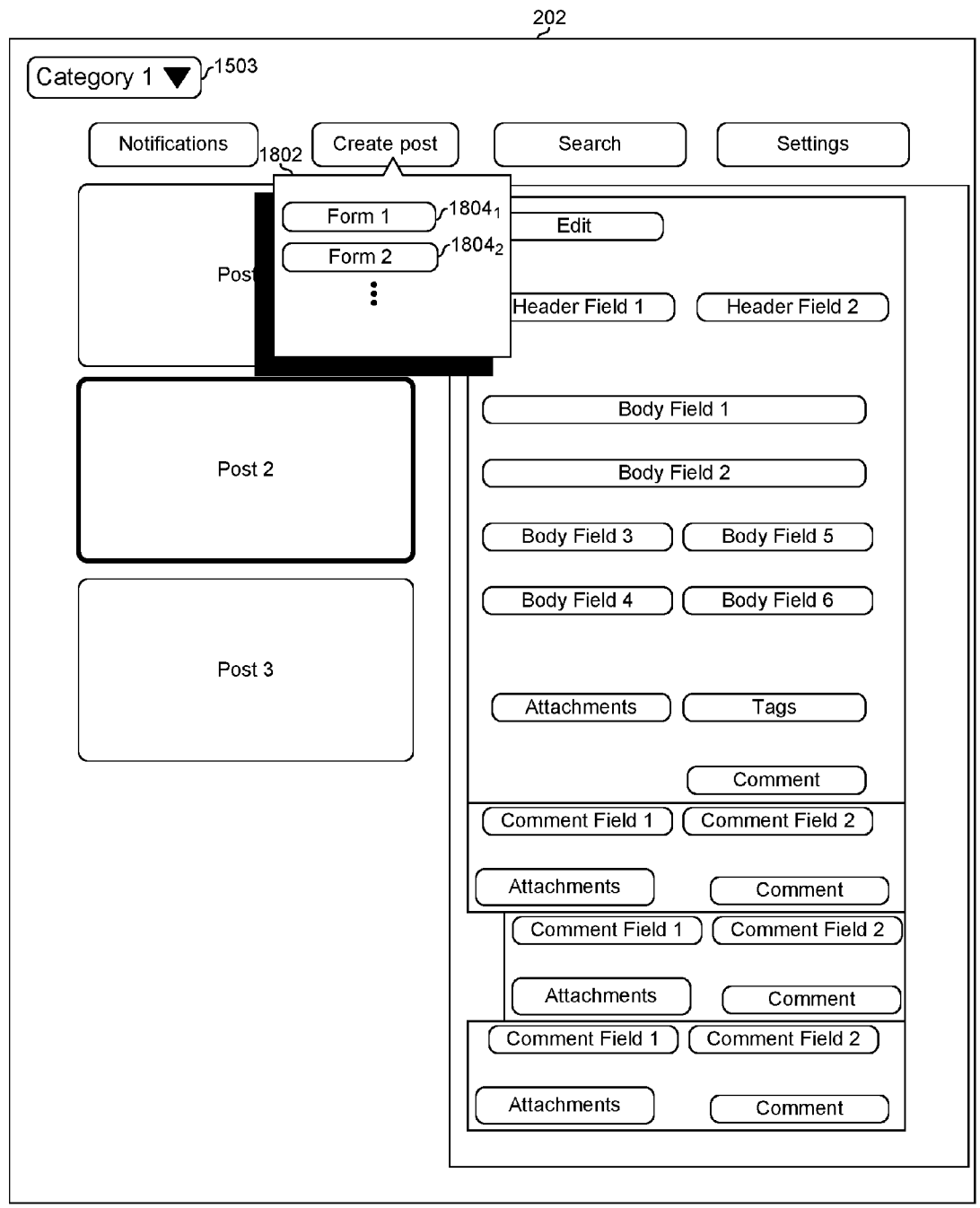
FIG. 18A depicts the example screen of FIG. 15A after selection of the "create post" interface element.

FIG. 18A depicts the example screen of FIG. 15D after selection of the "create post" interface element 1506. In response to user interaction with the create post element 1506, a form selection interface element 1802 is presented (e.g., as a pop-up, overlay, new window, etc.). The interface element 1802 comprises a plurality of elements 1804, each corresponding to a respective one of a plurality of post creation forms. In response to selection of an element 1804$_X$, a respective one of the post creation forms may be presented (e.g., as a pop-up, overlay, new window, etc.). In the example implementation depicted, the form 1818$_1$ of FIG. 18B (e.g., a "Discussion" form of a real estate category) may have been used to generate Post 3 of FIG. 15D and the form 1818$_2$ of FIG. 18C (e.g., a "pocket listing" form of a real estate category) may have been used to generate Post 2 of FIG. 15A.

Figure 18B:
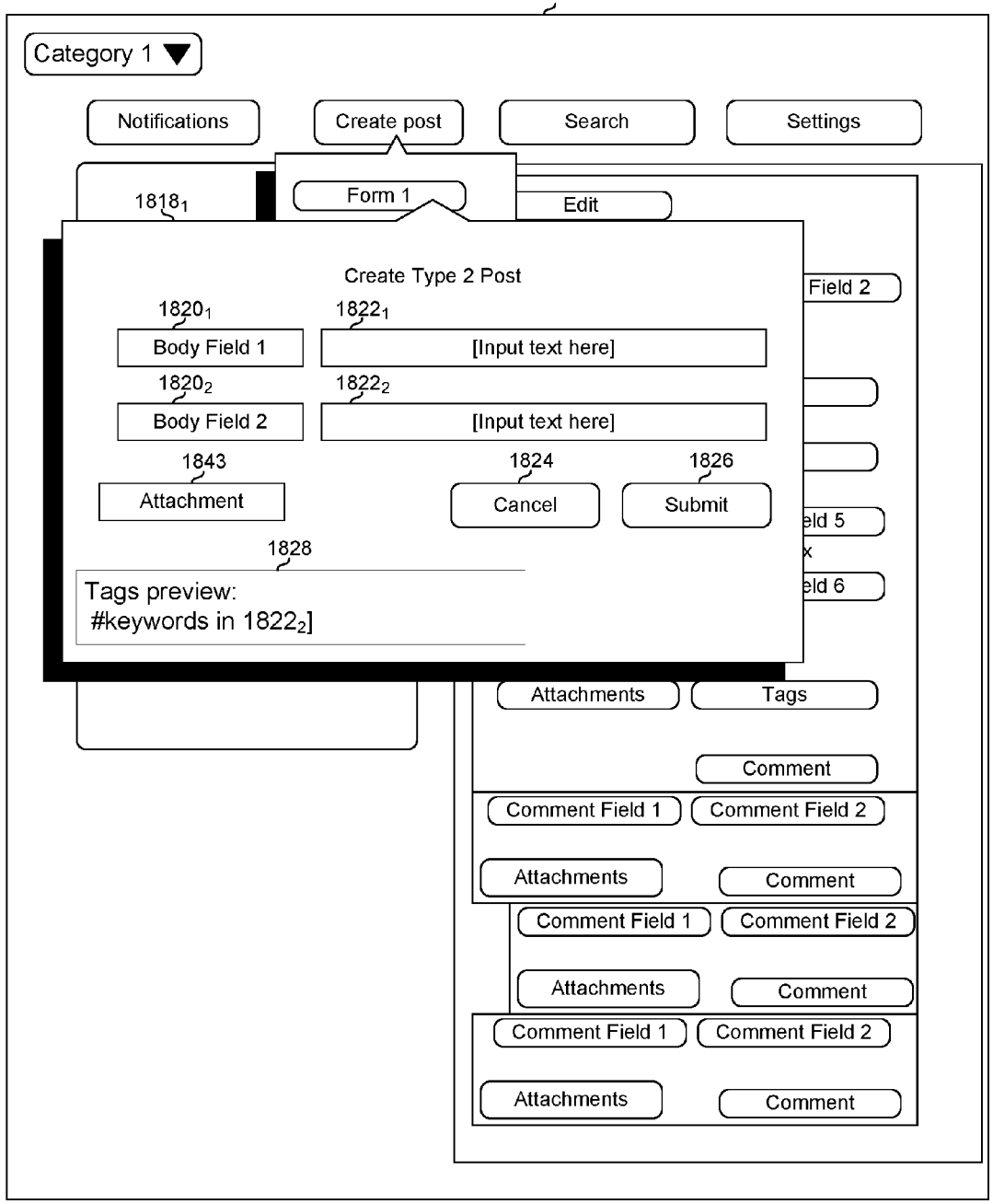
FIG. 18B depicts the example screen of FIG. 18A after selection of the "Form 1" interface element.
Figure 18C:
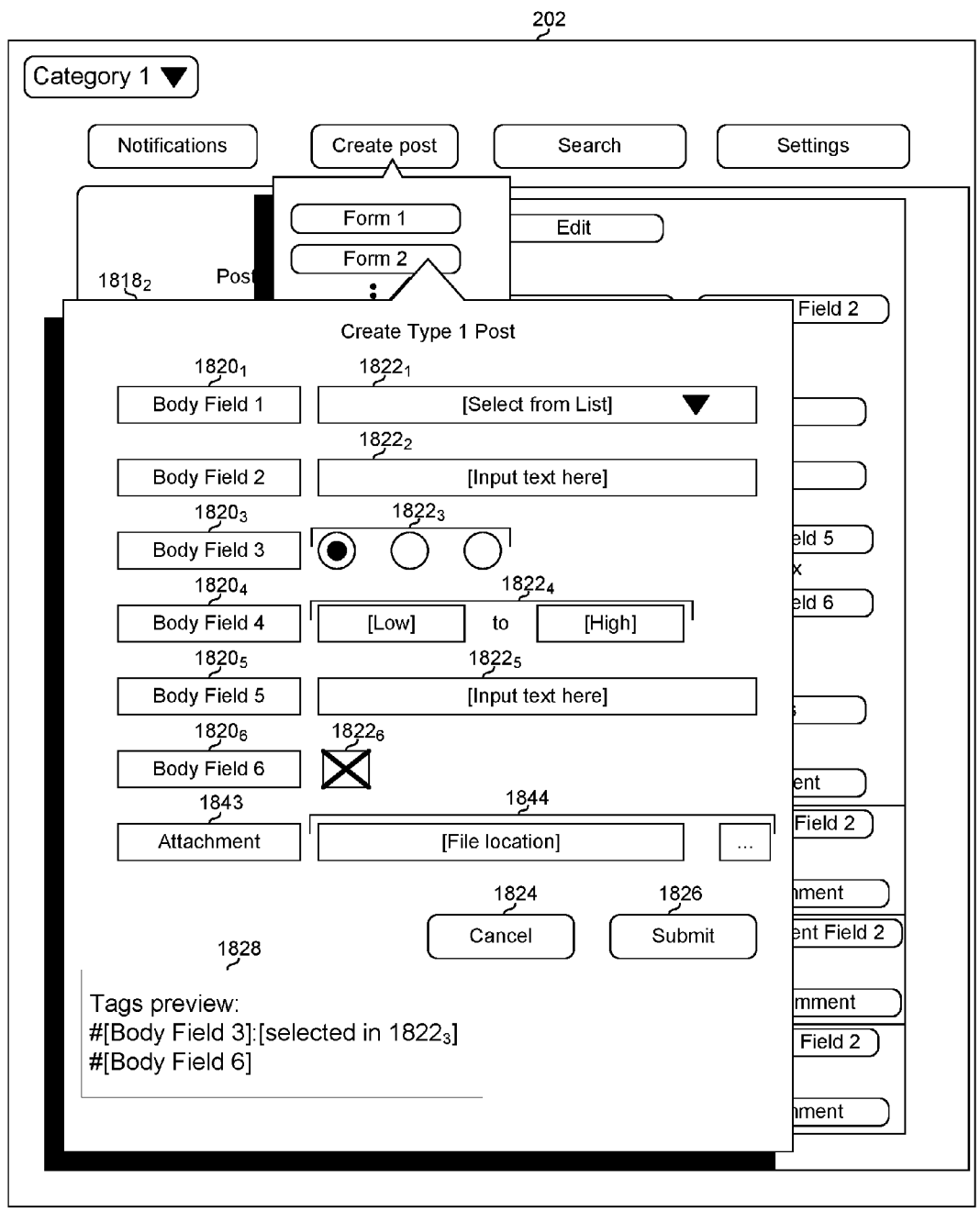
FIG. 18C depicts the example screen of FIG. 18A after selection of the "Form 2" interface element.

Referring generally to FIGS. 18B and 18C, post creation form 1818$_Z$ (Z here representing 1 for FIG. 18B and 2 for FIG. 18C) may comprise one or more elements 1820, one or more elements 1822, a "cancel" element 1824, a "submit" element 1826, and a tag preview element 1828.

Each element 1820$_X$ (X here representing any value between 1 and 2 in FIG. 18B and between 1 and 6 in FIG. 18C) may present a label for Body Field X and corresponding element 1822$_X$ may be a user input interface element for entering data for Body Field X. The type of the element 1822$_X$ may be determined by the selected post creation form 1818$_Z$. The type of element 1822$_X$ may be fixed (e.g., element 1822$_X$ will have the same type for all posts created with the form 1818$_Z$) or may be variable (e.g., the type of 1822$_X$ is determined on a post-by-post basis based on an element-type-selection rule set forth in form 1818$_Z$). Examples of the types of elements 1822 include: text boxes (e.g., 1822$_1$ and 1822$_2$ in FIG. 18B and 1822$_2$ in FIG. 18C), drop-down lists (e.g., 1822$_1$ in FIG. 18C), checkboxes (e.g., 1822$_6$ in FIG. 18C), groups of radio buttons (e.g., 1822$_3$ in FIG. 18C), value range boxes (e.g., 1822$_4$ in FIG. 18C), and/or the like. The type of element 1822$_X$ may be determined based, at least in part, on the type of data input to and/or expected for the Body Field X. As another example, data type may be an input to an element-type-selection rule defined in form 1818$_Z$. Example data types include, but are not limited to: integer, character, string, floating point number, Boolean, an array of any of the foregoing, and/or the like.

As an example, an integer may be expected for Body Field X and, accordingly, element 1822$_X$ may be a text box that accepts an integer typed by a user, a drop down list of integer values, or a radio button with multiple selectable integer values. As another example, a string may be expected for Body Field X and, accordingly, element 1822$_X$ may be a text box that accepts mixed letters and numbers typed by a user. As another example, a pair of integers representing a range may be expected for Body Field X and, accordingly, element 1822$_X$ may be a pair of boxes into which a user types a lower limit integer and an upper limit integer. As another example, one of an enumerated list of values and, accordingly, element 1822$_X$ may be a drop down list containing the possible values, or may be a group radio button with each button corresponding to one of the possible values. As another example, a Boolean ("true" or "false") value may be expected for Body Field X and, accordingly, element 1822$_X$ may be a checkbox with checked corresponding to "true" and unchecked corresponding to "false."

Each of the elements 1822$_X$ may be designated as optional or mandatory. A mandatory field may be one where user input of the expected type must be entered before the form can be submitted and the post created. An optional field may be one which need not be completed in order to create a post, an incomplete optional field may, for example, result in a blank interface element in a resulting post.

Selection of the element 1824 may cancel the form 1818$_Z$ without creation of a post. Selection of element 1826 may create a post based on the element(s) 1820, on the input provided via element(s) 1822, on search rules set forth by the post creation form, and/or on tag generation rules set forth by the post creation form (e.g., rules defined by a designer of the form). For example, the system (e.g., 104) hosting the electronic forum may perform the following in response to selection of element 1826 in form: (1) a new record corresponding to a new post may be created in a database; (2) one or more fields of the record is/are populated with metadata regarding the post (e.g., an identifier of the form used to create the post, the name of the user that created the post, the time the post was created, etc.); (3) one or more fields of the record is/are populated with information entered into one or more fields 1822; and (4) one or more fields of the record is/are populated with one or more tags generated based on the tag generation rules defined in the form used to create the post.

The element 1828 may preview the tags that will be generated and associated with the post upon clicking "submit" element 1826. The tags may be generated based on one or more tag generation rules that were defined for the form during creation of the form. The tag generation rules may determine whether or not one or more tags are generated for a particular post. The tag generation rules may determine which fields 1820 and/or 1822 to use in one or more tag(s) of a particular post (e.g., which of fields 1820$_1$-1820$_6$ and 1822$_1$-1822$_6$ to use in tagging a post created via form 1818$_2$ of FIG. 18C). The tag generation rules may determine how to format the tag(s) of a particular post (e.g., how to punctuate the tag(s), how to handle whitespace or other special characters appearing in the selected field(s) 1820 and/or 1822, etc.). Generally speaking, tag generation rules may use any suitable expressions, operators, flow control statements, etc. In an example implementation, the tag generation rules may be stored in a text-based format such as JavaScript Object Notation (JSON), extensible markup language XML, or the like. A few non-limiting examples are presented next to help illustrate automatic tag generation.

As a first example of automatic tag generation based on defined rules, assume a tag generation rule of form 1818$_1$ in FIG. 18B dictates that a tag to be associated with a post created via the form 1818$_1$ shall consist of "#[keywords in element 1822$_2$ separated by '+' arranged with neighborhood first and home type second]" and that a list of neighborhood keywords: "Wicker Park, West Loop, Bucktown" and a list of home type keywords "Condo, townhouse, loft" are associated with the form $1818_1$. Next, assume that a user types "Two-Bedroom Loft for Rent in Wicker Park" into the element $1822_2$. Based on these assumptions, a tag automatically generated and associated with the post would be "#WickerPark+Loft".

As a second example of automatic tag generation based on defined rules, assume a first tag generation rule of form $1818_2$ in FIG. 18C dictates that a tag to be associated with a post created via the form $1818_1$ shall consist of "#[Body Field 3]:[selected in $1822_3$]." Next, assume that Body Field 3 is "No. of Beds," and in $1822_3$ the user has selected a radio button corresponding to "2." Based on these assumptions, tags automatically generated and associated with the post would be "#No.ofBeds:2".

As a third example of automatic tag generation based on defined rules, assume that a tag generation rule associated with form $1818_2$ of FIG. 18C is: "if $1822_6$ is checked, then '[Body Field 6],'" and assume that Body Field 6 is "ParkingIncluded." Based on this assumption, when a user checks box $1822_6$, a resulting post will be tagged #ParkingIncluded, but when a user does not check box $1822_6$, a resulting post will not have a tag regarding parking (an alternative rule could establish such a post being tagged with #ParkingNotIncluded, for example).

Figure 19A:
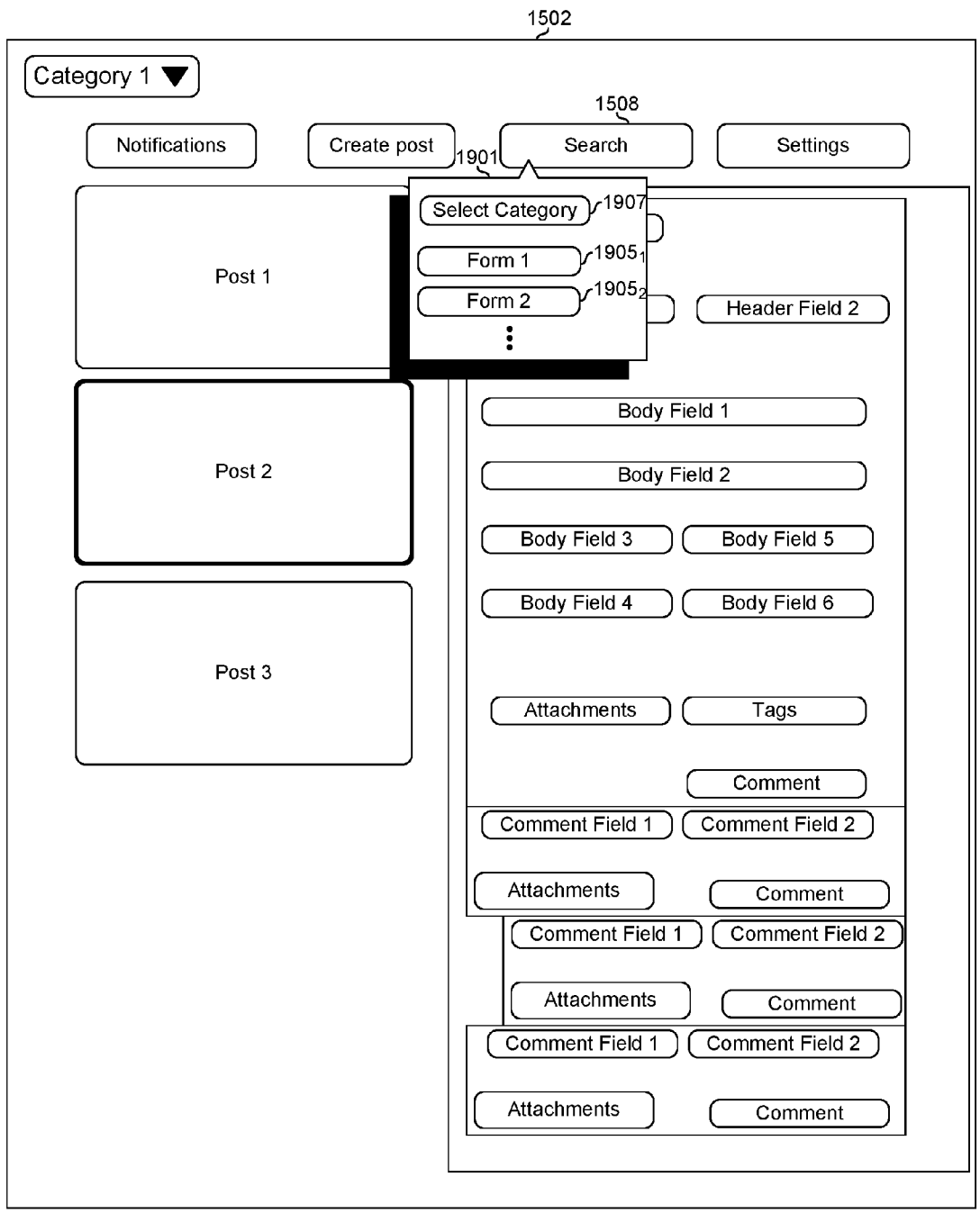
FIG. 19A depicts the example screen of FIG. 15A after selection of the "search" interface element.

FIG. 19A depicts the example screen of FIG. 15A after selection of the "search" interface element 1508. In response to user interaction with the search element 1508, a search form selection interface element 1901 is presented (e.g., as a pop-up, overlay, new window, etc.). The interface element 1901 comprises an element 1907 and a plurality of elements 1905. The element 1907 enables selection of the category or categories in which posts are to be searched. Each of the elements 1905 corresponds to a respective one of a plurality of search forms. Each of the search forms may be a counterpart of a respective one of the plurality of post creation forms available in the electronic forum. In this regard, different search forms may be tailored for searching different types of posts. In an example implementation, however, one or more aggregate search forms may be available for simultaneously searching multiple types of posts.

In response to selection of an element $1905_X$ (X here representing any value between 1 and 2) a respective one of the search forms may be presented (e.g., as a pop-up, overlay, new window, etc.). In the example implementation depicted, the form $1909_2$ of FIG. 19C may be used to search posts, such as Post 3 of FIG. 15D, generated with post creation form $1818_1$ of FIG. 18B, and the form $1909_1$ of FIG. 19B may be used to search posts, such as Post 2 of FIG. 15A, generated with post creation form $1818_2$ of FIG. 18C.

Figure 19B:
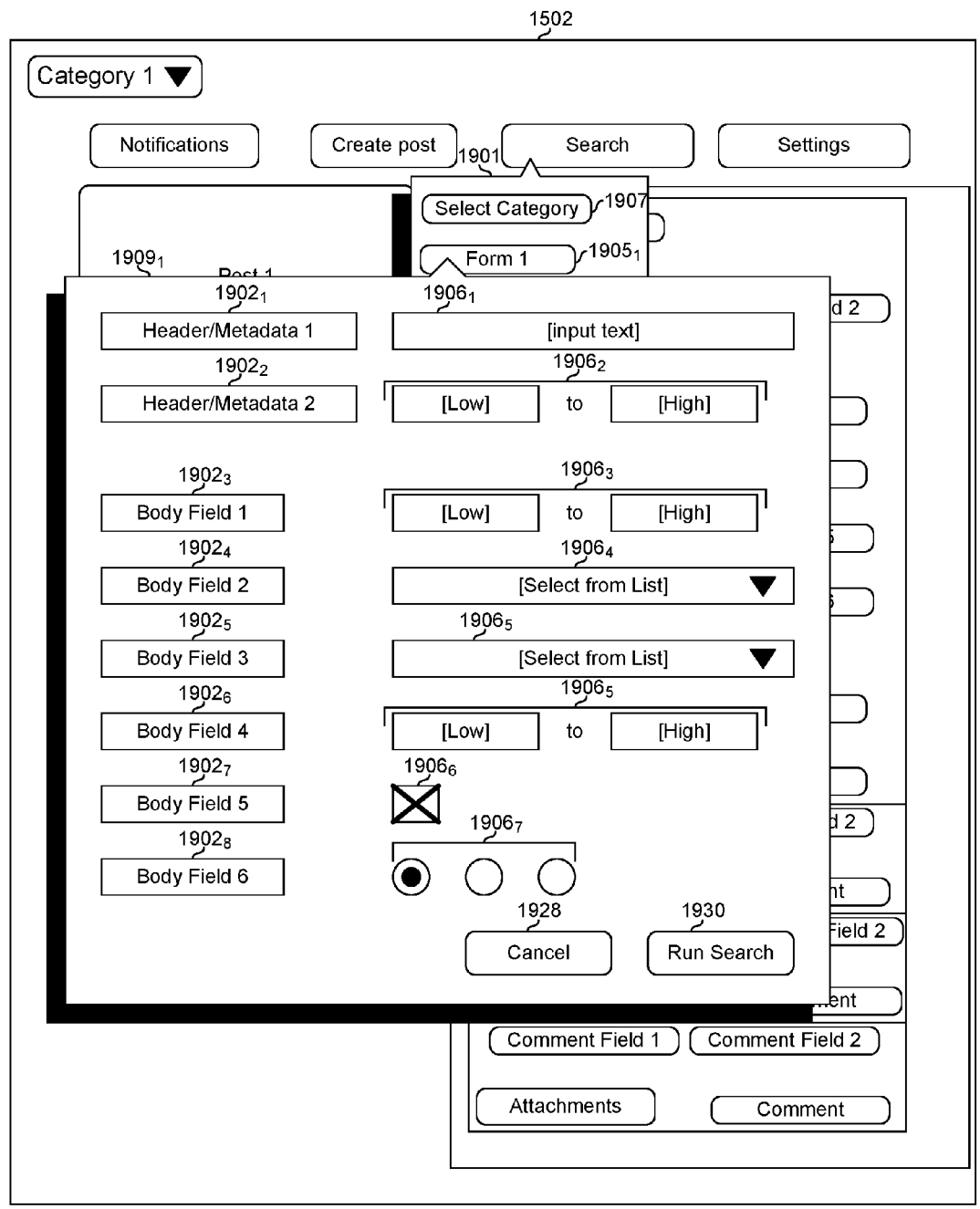
FIG. 19B depicts the example screen of FIG. 18A after selection of the "Form 1" interface element.
Figure 19C:
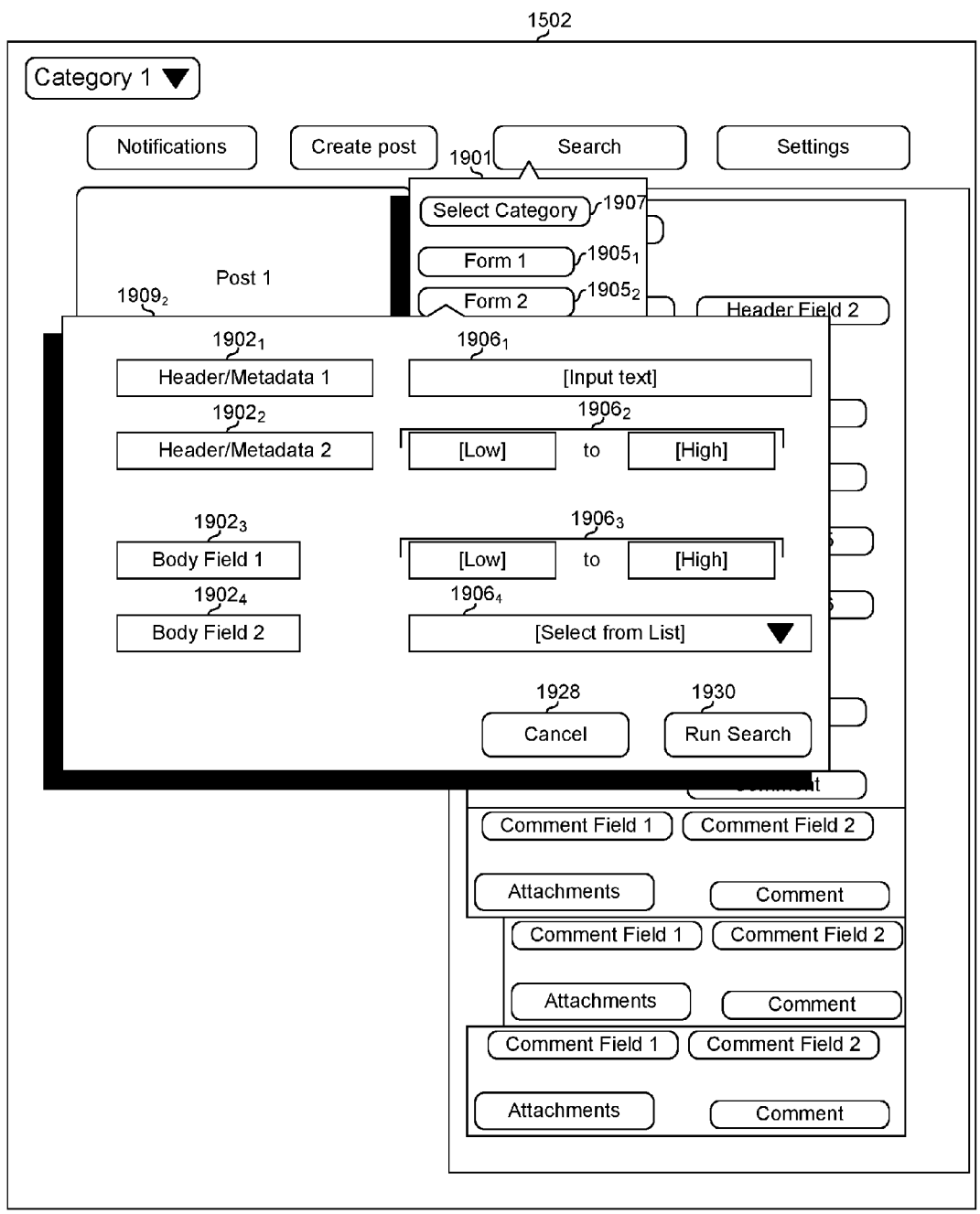
FIG. 19C depicts the example screen of FIG. 18A after selection of the "Form 2" interface element.

Referring generally to FIGS. 19B and 19C, each search form may comprise one or more elements 1902, one or more elements 1906, a "cancel" element 1928, and a "run search" element 1930.

Selection of the element 1928 may cancel the form without running the search. Selection of element 1930 which may run a search of the post(s) associated with the selected search form in the category or categories selected via element 1907 and searching for user input entered into one or more of fields 1906.

Each element $1902_X$ (X here representing any value between 1 and 2) may present a label for Body Field X and corresponding element $1906_X$ may be corresponding a user input interface element for entering values of Body Field X for which posts of the selected category(ies) are to be searched. In the example implementation depicted, the elements 1902 of form $1909_1$ correspond to fields of posts (e.g., Post 2 of FIG. 15A) created with the form $1818_2$, and the elements 1902 of form $1909_2$ correspond to fields of posts (e.g., Post 3 of FIG. 15D) created with form $1818_1$.

Each element $1906_X$ (X here representing any value between 1 and 4 for FIG. 19C and 1 and 7 for FIG. 19B) may be a user input interface element for inputting search parameters for Body Field X. The type of element $1906_X$ may be determined based on the search rules of the posts to be searched. As an example, for searching posts of a type in which Body Field X is of type integer, the search rules for those posts may dictate that element $1906_X$ be, for example: a drop down list of integers to search for in Body Field X, value range box for inputting a lower limit and upper limit of a range of integers to be searched for in Body Field X, a group or radio buttons for selecting one of an enumerated list of integers to be searched for in Body Field X, or the like. As another example, for searching posts of a type in which Body Field X is of type string, the search rules of those posts may dictate that element $1906_X$ be, for example: a drop down list of string values for which to search Body Field X, a text box for typing in a string to be searched for in Body Field X, or the like. As another example, for searching posts of a type in which Body Field X is of type boolean, the search rules for those posts may dictate that element $1906_X$ be, for example, a checkbox.

Figure 20A:
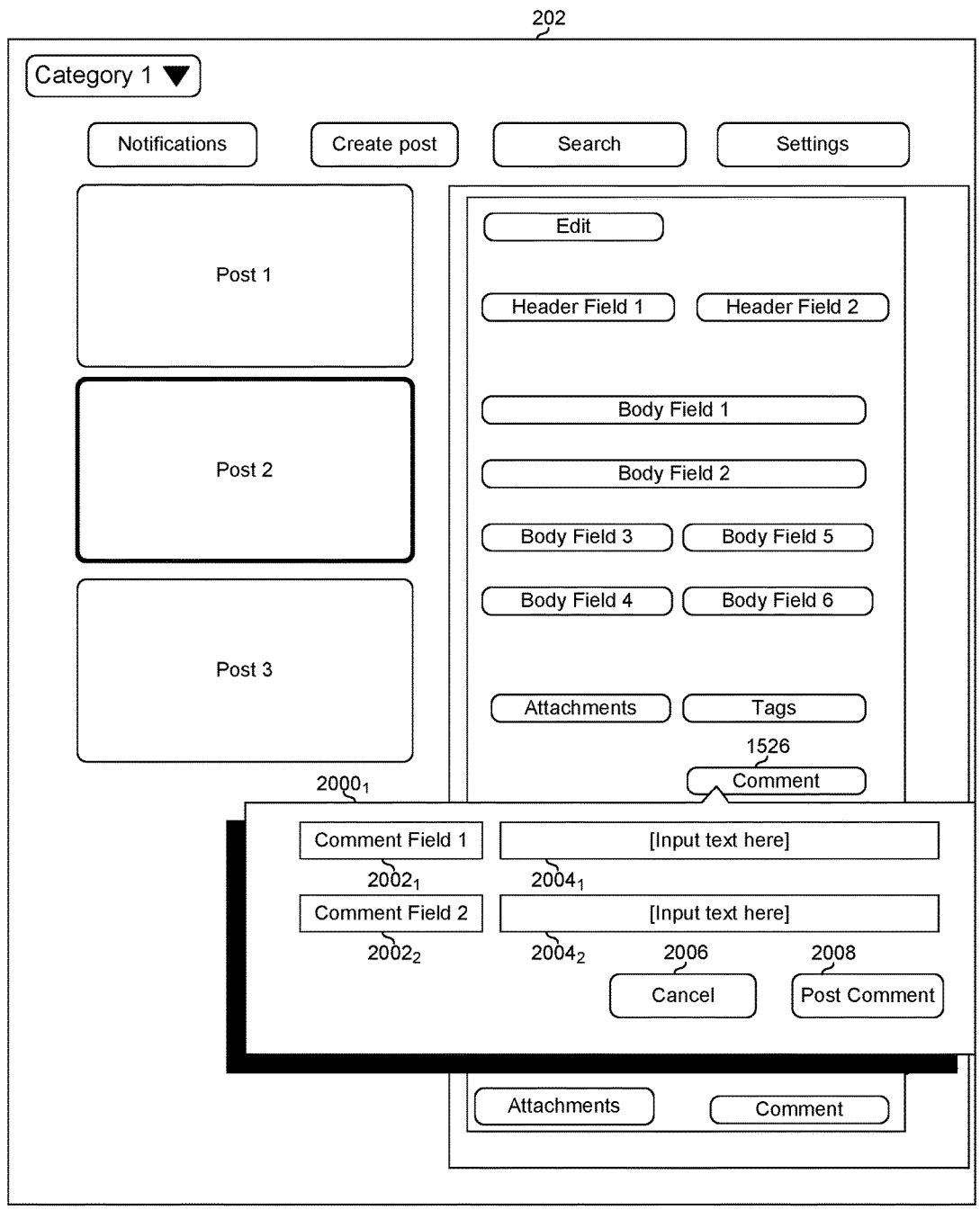
FIG. 20A depicts the example screen of FIG. 15A after selection of the "Comment" interface element that is part of the first example post.
Figure 20B:
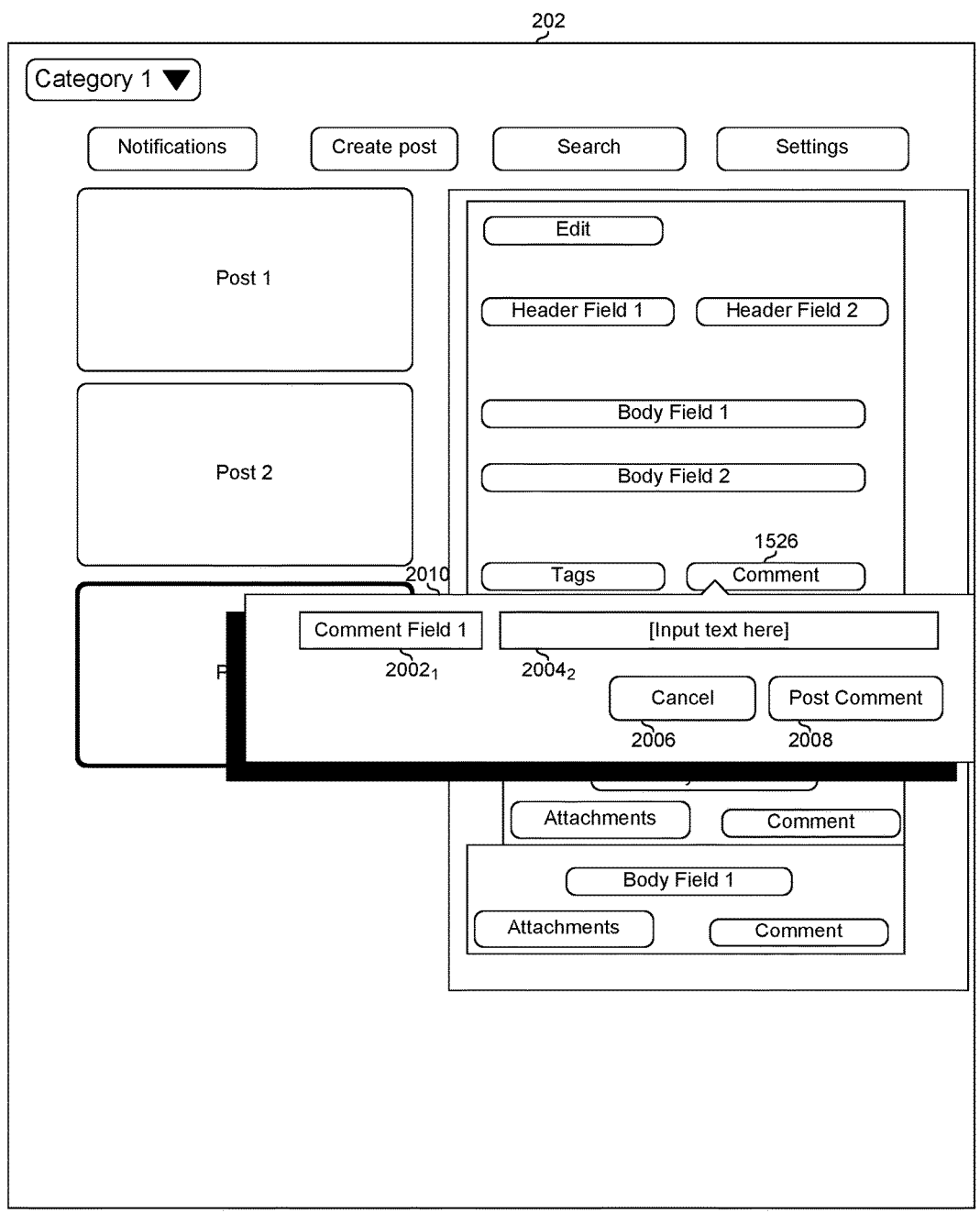
FIG. 20B depicts the example screen of FIG. 15D after selection of the "Comment" interface element that is part of the second example post.

FIGS. 20A and 20B depict example comment creation forms. In FIG. 20A a comment creation form $2000_1$ is presented (e.g., as a pop-up, overlay, new window, etc.) in response to selection of the element 1526 that is part of Post 2 shown in FIG. 15A. In FIG. 20B, a comment creation form $2000_2$ is presented in response to selection of element 1526 that is part of Post 3 shown in FIG. 15D. As illustrated by FIGS. 20A and 20B, the type of comment form that is presented in response to interacting with a "Comment" interface element may depend on the type of post or comment in which the interacted-with "comment" element appears. That is, the comment forms may be customized to the type of post or comment being commented on.

Referring generally to FIGS. 20A and 20B, each comment creation form may comprise one or more elements 2002, one or more elements 2004, a "cancel" element 2006, and a "post comment" element 2008.

Selection of the element 2006 may cancel the form without posting a comment. Selection of element 2008 may create a comment based on the element(s) 2002, on the input provided via element(s) 2004, and/or on tag generation rules associated with the comment creation form. For example, the system (e.g., 104) hosting the electronic forum may perform the following in response to selection of element 2006 in form $2000_X$: (1) a new record corresponding to a new comment may be created in a database; (2) one or more fields of the record is/are populated with metadata regarding the comment (e.g., an identifier of the form used to create the post, the name of the user that created the post, an identifier of the post or comment being commented on, a timestamp of the comment, etc.); (3) one or more fields of the record is/are populated with information entered into one or more fields $2004_Y$; and (4) one or more fields of the record is/are populated with one or more tags generated based on the tag generation rules defined in the form $2000_X$ used to create the comment.

Each element $2002_Y$ may present label for Comment Field X and corresponding element $2004_Y$ may be a user input interface element for entering data for Comment Field X.

The type of element $2004_Y$ may be determined by the selected comment creation form $2000X$. The type of element $2004_Y$ may be fixed (e.g., element $2004_Y$ will have the same type for all comments created with the form $2000_X$) or may be variable (e.g., the type of $2004_Y$ is determined on a comment-by-comment basis based on an element-type-selection rule set forth in form $2000_X$). Examples of the types of elements 2004 include: text boxes, drop-down lists, checkboxes, groups of radio buttons, value range boxes, and/or the like. The number and/or types of elements 2002 and 2004 in any particular comment form may be determined by the post to which the comment is being added. As a result, in the example implementation depicted, the comment form $2000_1$ comprises two each of elements 2002 and 2004, whereas the comment form $2000_2$ comprises only one each of elements 2002 and 2004.

Figure 21A:
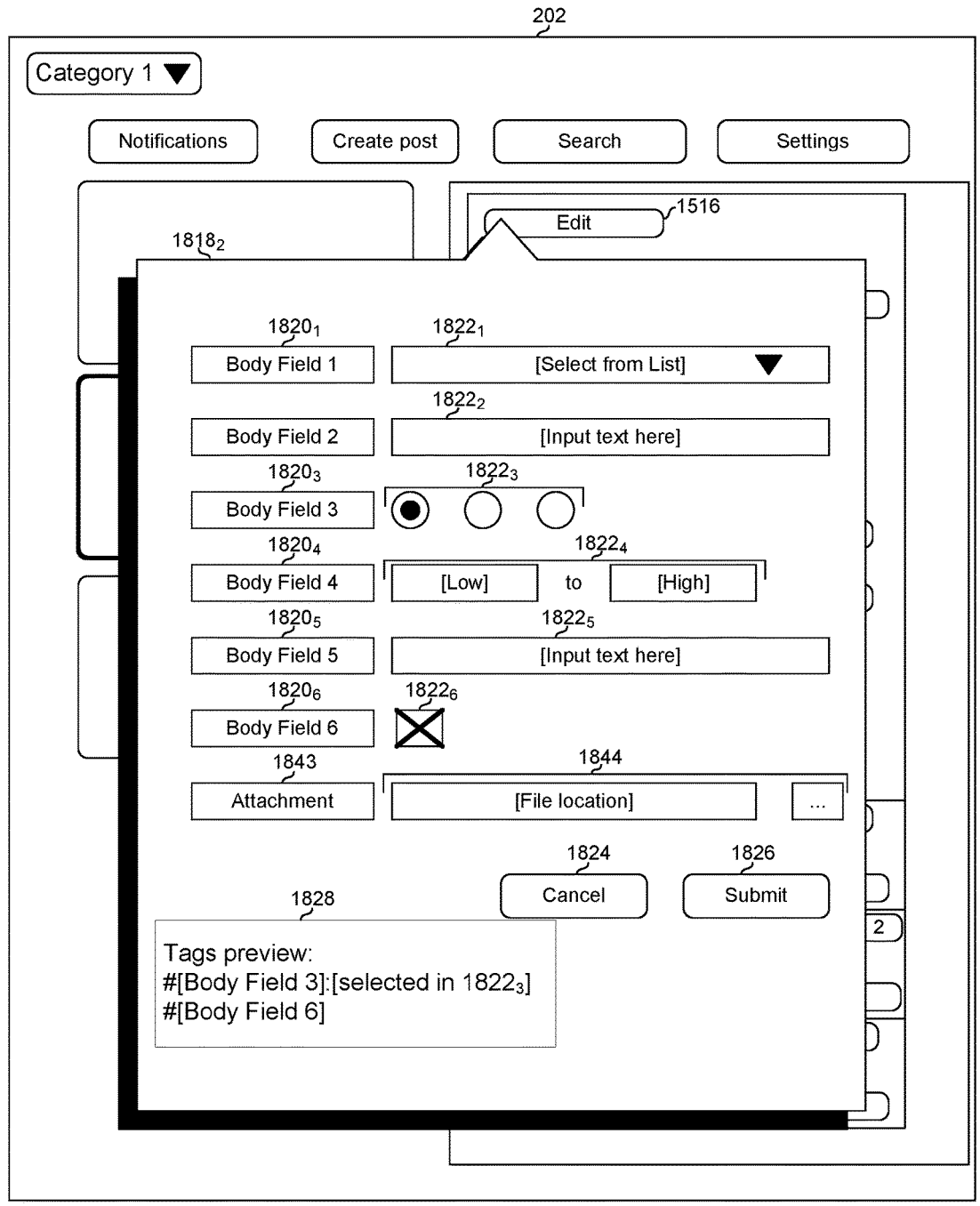
FIG. 21A depicts the example screen of FIG. 15A after selection of the "Edit" interface element that is part of the first example post.
Figure 21B:
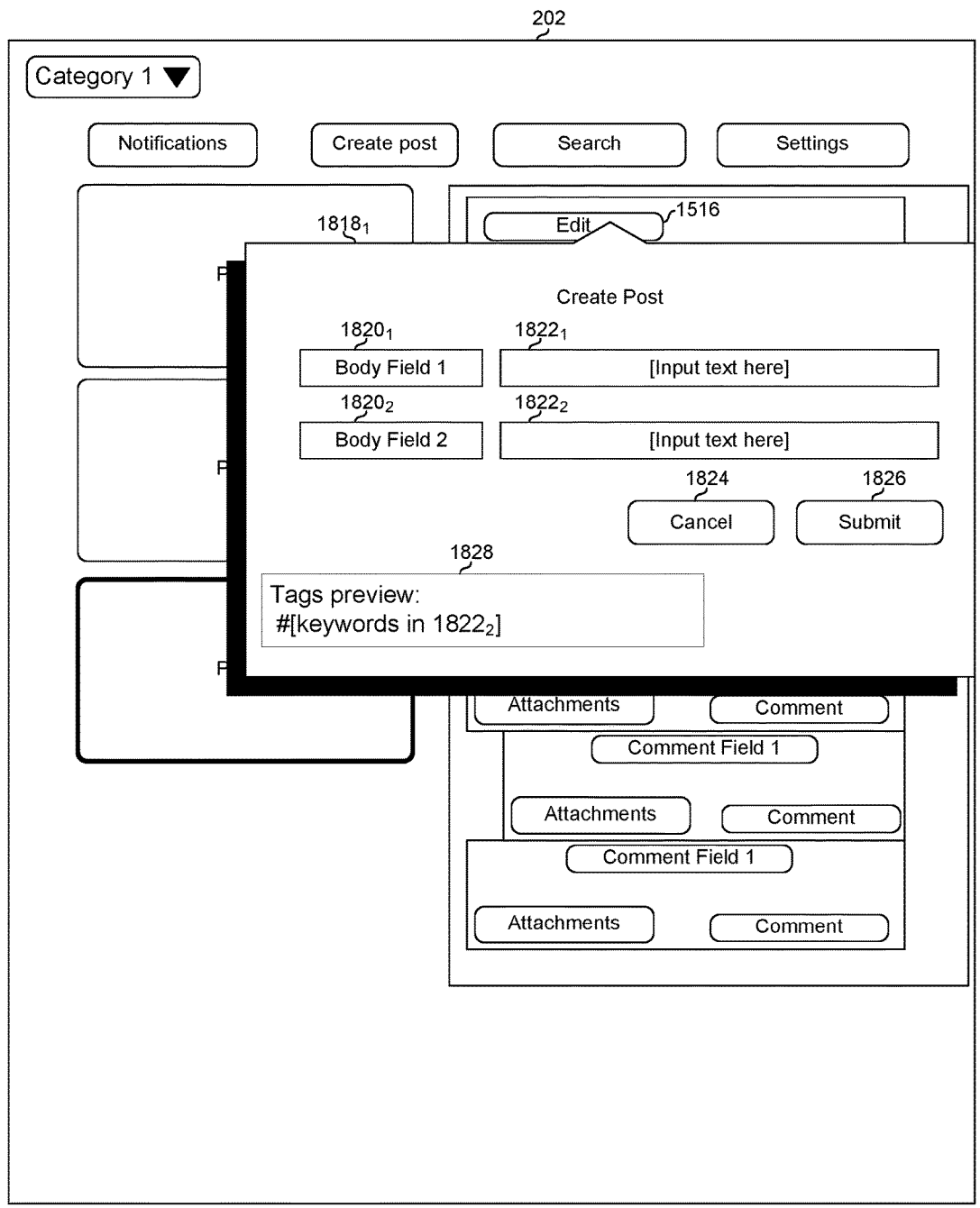
FIG. 21B depicts the example screen of FIG. 15D after selection of the "Edit" interface element that is part of the second example post.

FIGS. 21A and 21B depict example post editing forms. In an example implementation, the posts being stored as structured data may enable editing the posts via a form that is the same, or substantially similar, to the form that was used to create the post. Accordingly, in FIG. 21B form $1818_1$ may be presented in response to selection of the edit element 1516 in Post 2 and, in FIG. 21A, form $1818_2$ may be presented in response to selection of the edit element 1516 in Post 3. Each of the fields 1520 may be designated as editable or non-editable.

In an example implementation, editing of a post may comprise the following: (1) in response to element 1516 being selected (e.g., touched or clicked) on a client device viewing the forum (e.g., in a web browser or native app) a database record corresponding to the post is retrieved from memory; (2) the record is parsed to recover components of the post; (3) the applicable post editing form (e.g., identified in the structured data of the post) is populated based on the recovered components of the post; (3) a user edits the one or more fields of the post which are designated as editable; (4) the edited post is are stored as structured data (e.g., overwriting the original structured data and/or database record in which it is stored, or adding to the original structured data and/or database record in which it is stored).

Figure 22:
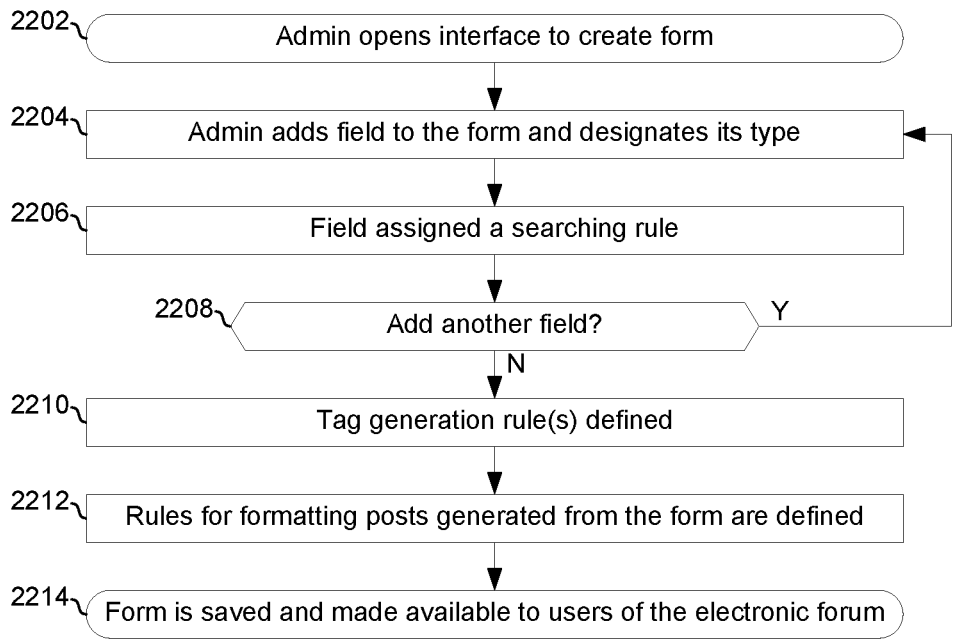
FIG. 22 depicts a flowchart of an example process for creating a form for post generation in an electronic forum.

FIG. 22 depicts a flowchart of an example process for creating a form for post generation in an electronic forum.

The example process begins with block 2202 in which an administrator of the electronic forum opens up an interface for designing a post creation form such as the forms $1818_1$ and $1818_2$.

In block 2204, the administrator adds a field to the form. This may include designating the type and/or format of data that the field will hold. Example types include integer, character, Boolean, string, array of any of the other types, etc. The data type may be used for indexing the field for later searching of the post.

In block 2206, the administrator generates a search rule for the field added in block 2204. As an example, where the field is of type integer, the administrator may select a search rule which dictates that a search form generated for searching posts containing the field include a drop down list interface element for selecting, from a finite list, an integer to search for in the field. As another example, where the field is of type boolean, the administrator may select a search rule which dictates that a search form generated for searching posts containing the field include a check box that corresponds to "true" when checked and "false" when unchecked. As another example, where the field is of type string, the administrator may select a search rule which dictates that a search form generated for searching posts containing the field include a text box into which a user may input a string to be searched for in the field.

In block 2208, if another field is to be added to the form, the process may return to block 2204. Otherwise, the process may advance to block 2210.

In block 2210, the administrator may create tag generation rules for the form. The tag generation rules may be stored in a text-based format such as, for example, JSON, XML, or the like.

In block 2212, rules for formatting a post generated from the form may be defined. Such rules may include, for example, the fonts to be used, the character set to be used, where each of the fields of the post should be visually located, etc. The formatting may be stored as a cascaded style sheet (CSS) file.

In block 2214, the form is saved and made available for use by users of the electronic forum (e.g., via "create post" element 1806).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform processes as described herein.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. An electronic collaboration system comprising:
    one or more storage devices on which resides at least one database in which is stored a plurality of user-posted messages, wherein each of the plurality of user-posted messages is associated, in the at least one database, with at least one of a plurality of tags;
    interface generation circuitry operable to:
        access the one or more storage devices;
        generate at least one first user interface element of the electronic collaboration system, wherein the at least one first user interface element is interactive such that a user can interact with it to select from among a plurality of categories;
        generate a first plurality of second user interface elements of the electronic collaboration system when a first one of the plurality of categories has been selected via the first user interface element, and a second plurality of second user interface elements of the electronic collaboration system when a second one of the plurality of categories has been selected via the first user interface element, wherein:
            each of the first plurality of second user interface elements is associated, in the at least one database, with a respective one of the plurality of tags, and is interactive such that a user can select it to select the associated one of the plurality of tags; and
            each of the second plurality of second user interface elements is associated, in the at least one database, with a respective one of the plurality of tags, and is interactive such that a user can select it to select the associated one of the plurality of tags;
        generate a third user interface element of the electronic collaboration system that presents the user-posted messages associated with the selected one of the plurality of tags; and
    network interface circuitry operable to receive, via a network, requests generated in response to user interaction with the at least one first user interface element, the first plurality of second user interface elements, the second plurality of second user interface elements; and the third user interface element.

2. The electronic collaboration system of claim 1, wherein any particular one of the plurality of tags is associated, in the at least one database, with a plurality of users of the electronic collaboration system such the plurality of users are permitted to view, via the third interface element, the user-posted messages associated with the particular one of the plurality tags.

3. The electronic collaboration system of claim 1 comprising post generation circuitry operable to generate, automatically in response to a change in data stored in said at least one database, a message to be stored to the database and presented in the third interface element.

4. The electronic collaboration system of claim 1, wherein the interface generation circuitry is operable to generate a form that user can interact with to generate a new user-posted message to be stored to the database and presented in the third interface element.

5. The electronic collaboration system of claim 4, wherein:
    the form comprises one or more user interface input elements via which a user can input content to be included in the new user-posted message; and
    the interface generation circuitry is operable to determine how many of the user interface input elements to include in the form based on which of the categories is to be associated, in the at least one database, with the new user-posted message.

6. The electronic collaboration system of claim 4, wherein:
    the form comprises one or more user interface input elements via which a user can input content to be included in the new user-posted message; and
    the interface generation circuitry is operable to determine how many of the user interface input elements are to be included in the form based on which of the tags is to be associated, in the at least one database, with the new user-posted message.

7. The electronic collaboration system of claim 4, wherein:
    the form comprises one or more user interface input elements via which a user can input content to be included in the new user-posted message; and
    the interface generation circuitry is operable to determine a type of each of the user interface input elements based on which of the categories is to be associated, in the at least one database, with the new user-posted message.

8. The electronic collaboration system of claim 7, wherein the type of each of the user interface input elements is one of: text box, dropdown list, checkbox, radio button, and value range box.

9. The electronic collaboration system of claim 4, wherein:
    the form comprises one or more user interface input elements via which a user can input content to be included in the new user-posted message; and
    the interface generation circuitry is operable to determine a type of each of the user interface input elements based on which of the tags is to be associated, in the at least one database, with the new user-posted message.

10. The electronic collaboration system of claim 9, wherein the type of each of the user interface input elements is one of: text box, dropdown list, checkbox, radio button, and value range box.

11. The electronic collaboration system of claim 4, wherein:
    the post generation circuitry is operable to automatically add a tag to the content of the new user-posted message; and the tag automatically added to the content of the new user-posted message is determined by an automatic tagging rule associated, in the at least one database, with the form.

12. The electronic collaboration system of claim 11, wherein:
   the form comprises one or more user interface input elements via which a user can input content to be included in the new user-posted message;
   the automatic tagging rule references a particular one or more of the user interface input elements of the form; and
   the tag automatically added to the new user-posted message is formed from content entered by a user into the particular one or more of the user interface elements.

13. The electronic collaboration system of claim 4, wherein:
   the form is a comment creation form; and
   the interface generation circuitry is operable to generate the comment creation form in response to user interaction with an interface element that indicates a desire to generate the new user-posted message as a comment to an existing one of the plurality of user-posted messages.

14. The electronic collaboration system of claim 13, wherein:
   the comment creation form comprises one or more user interface input elements via which a user can input content to be included in the new user-posted message; and
   the interface generation circuitry is operable to determine how many of the user interface input elements to include in the comment creation form based on which of a plurality of post creation forms is associated, in the at least one database, with the existing one of the plurality of user-posted messages.

15. The electronic collaboration system of claim 13, wherein:
   the comment creation form comprises one or more user interface input elements via which a user can input content to be included in the new user-posted message; and
   the interface generation circuitry is operable to determine a type of each of the user interface input elements of the comment creation form based on which of a plurality of post creation forms is associated, in the at least one database, with the existing one of the plurality of user-posted messages.

16. The electronic collaboration system of claim 1, wherein:
   each of the plurality of user-posted messages is associated, in the at least one database, with a search rule;
   the interface generation circuitry is operable to:
      present an interface element via which a user can indicate a subset of the user-generated messages to be included in a search; and
      generate a search form based on a search rule associated, in the at least one database, with the subset of user-posted messages to be included in the search.

17. The electronic collaboration system of claim 13, wherein:
   the search form comprises one or more user interface input elements via which a user can input content to be used as search criteria; and
   the interface generation circuitry is operable to determine how many of the user interface input elements of the search form based on the search rule associated, in the at least one database, with the subset of user-posted messages to be included in the search.

18. The electronic collaboration system of claim 13, wherein:
   the search form comprises one or more user interface input elements via which a user can input content to be used as search criteria; and
   the interface generation circuitry is operable to determine a type of each of the user interface input elements of the search form based on the search rule associated, in the at least one database, with the subset of user-posted messages to be included in the search.

\* \* \* \* \*